US006422308B1

(12) United States Patent
Okawara et al.

(10) Patent No.: US 6,422,308 B1
(45) Date of Patent: *Jul. 23, 2002

(54) HEAT PUMP TYPE AIR CONDITIONER FOR VEHICLE

(75) Inventors: Yasuhito Okawara; Toshio Ohashi; Yuichi Meguriya; Tadayoshi Tajima, all of Tochigi (JP)

(73) Assignee: Calsonic Kansei Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/961,917

(22) Filed: Oct. 31, 1997

(30) Foreign Application Priority Data

Apr. 9, 1997 (JP) ........................................... 9-090854

(51) Int. Cl.[7] ........................... F25B 29/00; B60H 1/00

(52) U.S. Cl. ...................... 165/202; 165/203; 165/240; 165/241; 165/43; 237/2 B; 237/12.3 B; 62/173; 62/160; 62/324.1; 62/324.6; 62/196.4; 251/117

(58) Field of Search ...................... 62/173, 160, 324.1, 62/324.6, 196.4; 251/117; 165/202, 203, 240, 241, 42, 43; 237/2 B, 12.3 B

(56) References Cited

U.S. PATENT DOCUMENTS

| | | | | |
|---|---|---|---|---|
| 595,190 A | * 12/1897 | Miller | 251/117 |
| 1,115,244 A | * 10/1914 | Reynolds | 251/117 |
| 1,711,660 A | * 5/1929 | Stephenson | 251/117 |
| 1,885,851 A | * 11/1932 | McKee | 251/117 |
| 2,233,965 A | * 3/1941 | Stroviak | 251/117 |
| 2,525,709 A | * 10/1950 | Morrison | 251/117 |
| 3,779,031 A | * 12/1973 | Akiyama et al. | 62/173 |
| 4,632,358 A | 12/1986 | Orth et al. | 251/117 |
| 4,688,390 A | * 8/1987 | Sawyer | 62/160 |
| 5,152,465 A | * 10/1992 | Calabro | 251/117 |
| 5,291,941 A | * 3/1994 | Enomoto et al. | 237/2 B |
| 5,419,149 A | 5/1995 | Hara et al. | 62/160 |
| 5,473,906 A | * 12/1995 | Hara et al. | 62/160 |
| 5,537,831 A | * 7/1996 | Isaji et al. | 62/160 |
| 5,598,887 A | 2/1997 | Ikeda et al. | 165/202 |
| 5,634,348 A | * 6/1997 | Ikeda et al. | 62/173 |
| 5,706,664 A | * 1/1998 | Hara | 62/173 |
| 5,819,551 A | * 10/1998 | Fukumoto et al. | 62/160 |
| 5,988,155 A | * 11/1999 | Garceau et al. | 251/117 |
| 6,105,666 A | * 8/2000 | Tajima et al. | 165/202 |

FOREIGN PATENT DOCUMENTS

| | | | |
|---|---|---|---|
| DE | 645812 | * 6/1937 | 251/117 |
| EP | 0 681 933 | 11/1995 | |
| EP | 0 738 620 | 10/1996 | |
| JP | 0137841 | * 10/1979 | 62/173 |
| JP | 5-96931 | * 4/1993 | |
| JP | 6-34234 | * 2/1994 | 62/324.6 |
| JP | 6-159857 | * 6/1994 | 62/173 |

OTHER PUBLICATIONS

Patent Abstracts of Japan, Pub No. 59143716 published Aug. 17, 1984, inventor Kenichi Fujiwara (1984).*

* cited by examiner

*Primary Examiner*—John K. Ford
(74) *Attorney, Agent, or Firm*—Foley & Lardner

(57) ABSTRACT

A heat pump type air conditioner for a vehicle has a refrigeration cycle constituted by a compressor, an external heat exchanger, a refrigerant valve unit and an internal heat exchanger unit. The refrigerant valve unit includes first and second flow control valves, and the internal heat exchanger unit includes an auxiliary internal heat exchanger and a main internal heat exchanger. In the refrigeration cycle, the first flow control valve, the auxiliary internal heat exchanger, the second flow control valve and the main internal heat exchanger are serially connected in the order of mention. The main and auxiliary internal heat exchangers change their function between an evaporator and a condenser according to the controlled state of the first and second flow control valve.

22 Claims, 14 Drawing Sheets

Vs1 3 Vc1 M F Vs2 B Vc2 1 2 12a 5 5b 5a 4 30 14 12b 17d 17v 11F 15 16 11 11M Eb Ea 10 13 17f E

HEAT PUMP TYPE AIR CONDITIONER FOR VEHICLE

BACKGROUND OF THE INVENTION

The present invention relates to a heat pump type air conditioner for a vehicle, and more particularly to a vehicular air conditioner which executes a heating by operating a refrigeration cycle thereof.

Generally, an air conditioner employed in a vehicle is arranged to execute a heating operation by using a heater core circulating engine coolant and to execute a cooling operation by using a refrigeration system.

However, when an engine of the vehicle is started under a condition that an outside air temperature is considerably low, it is necessary to take a predetermined time period until the engine coolant is warmed at a temperature such as about 50° C. so as to be applied in the heating operation. Furthermore, if the engine is operated under idling condition or low-load condition, the temperature of the engine coolant tends to be kept at a temperature insufficient for a heater core to be applied to the heating operation.

SUMMARY OF THE INVENTION

It is an object of the present invention to provide a heat pump type air conditioner which quickly and sufficiently executes the heating operation by employing the refrigeration system of the air conditioner.

A first aspect of the present invention resides in a heat pump type air conditioner for a vehicle which executes a heating operation and a cooling operation according to a temperature condition. The heat pump type air conditioner comprises a compressor applying workload to refrigerant. An external heat exchanger is connected to an outlet of the compressor. A first flow control valve is connected to a refrigerant outlet of the external heat exchanger. An auxiliary internal heat exchanger is connected to an outlet of the first flow control valve. A second flow control valve is connected to a refrigerant outlet of the auxiliary internal heat exchanger. A main internal heat exchanger is connected to an outlet to the second flow control valve. A refrigerant outlet of the main internal heat exchanger is connected to an inlet of the compressor. An air delivering section flows air through the main and auxiliary internal heat exchangers and delivers the air to a passenger compartment of the vehicle.

A second aspect of the present invention resides in a heat pump type air conditioner which executes a heating operation and a cooling operation according to a temperature condition. The heat pump type air conditioner comprises a compressor applying workload to refrigerant. An external heat exchanger is connected to an outlet of the compressor. An auxiliary internal heat exchanger has a first port and a second portion and is arranged such that a cross sectional area of a refrigerant passage of the auxiliary internal heat exchanger is gradually increased from the first port to the second port. An expansion valve is connected to the first port of the auxiliary internal heat exchange. A refrigerant passage switching section selectively establishes a first refrigerant passage state for flowing the refrigerant from the expansion valve and the first port to the second port and a second refrigerant passage state for flowing the refrigerant from the second port to the first port and the expansion valve. A main internal heat exchanger is connected to one of the first and second ports from which the refrigerant is delivered. The refrigerant outlet of the main internal heat exchanger is connected to an inlet of the compressor.

DETAILED DESCRIPTION OF THE INVENTION

Referring to FIGS. 1 to 6B, there is shown a first embodiment of a heat pump type air conditioner according to the present invention.

Figure 1:
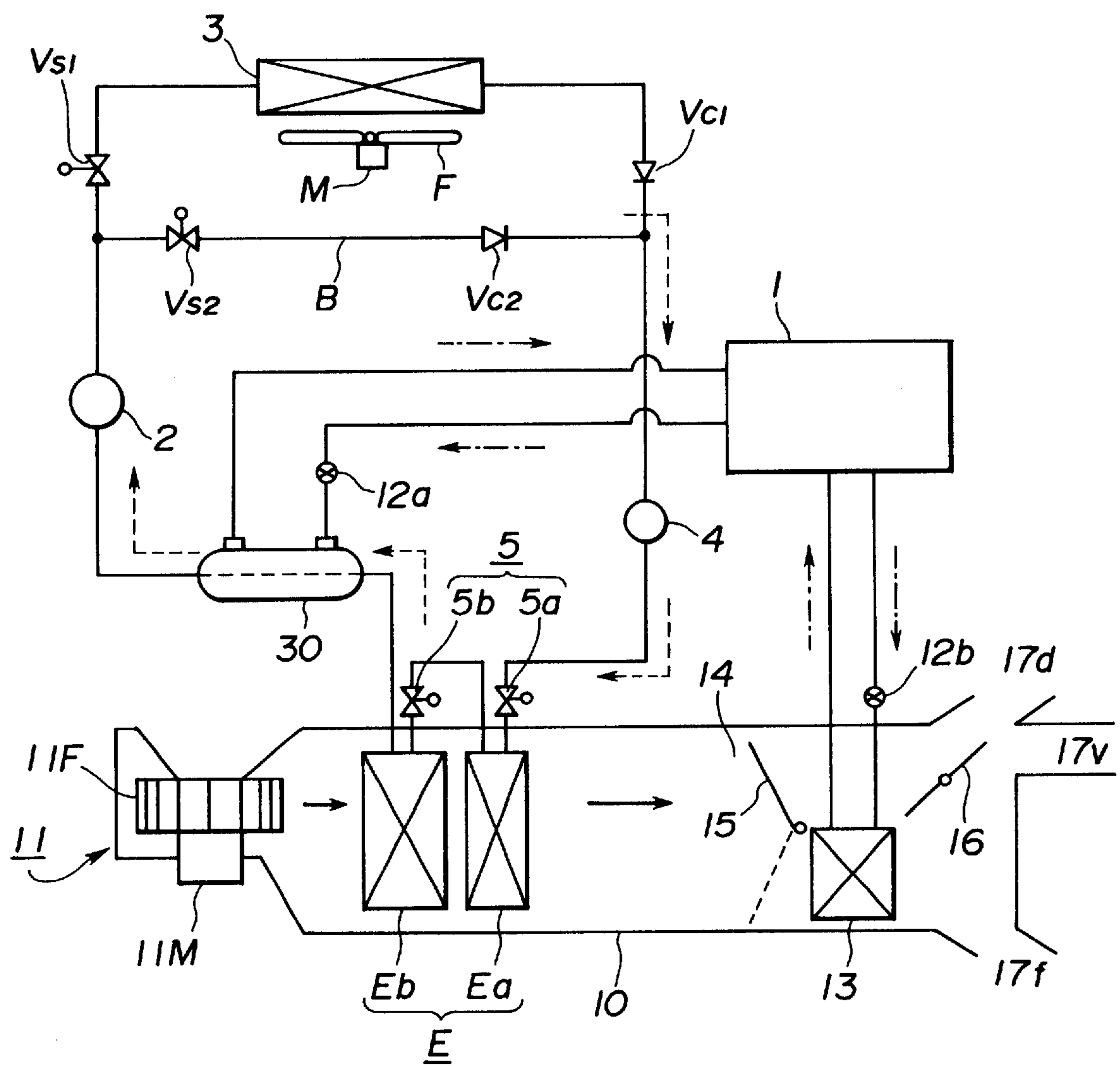
FIG. 1 is a schematic view which shows a first embodiment of a heat pump type air conditioner in a heating operation according to the present invention.

As shown in FIG. 1, the heat pump type air conditioner is for a vehicle and has a refrigeration cycle where refrigerant discharged from a compressor 2 is supplied to an external heat exchanger 3, a liquid tank 4, a refrigerant valve unit 5 and an internal heat exchanger unit E in the order of mention. The compressor 2 functions to apply workload to the refrigerant so that the refrigerant circulates the refrigeration cycle.

A bypass passage B is disposed parallel with the external heat exchanger 3. An inlet end of the bypass passage B is connected to a passage connecting the compressor 2 and the external heat exchanger 3. An outlet end of the bypass passage B is connected to a passage connecting the external heat exchanger 3 and the liquid tank (receiver) 4. A first switching valve $Vs_1$ is installed to a refrigerant inlet of the external heat exchanger 3 to selectively supply the refrigerant to the external heat exchanger 3. A first check valve $Vc_1$ is installed to a refrigerant outlet of the external heat exchanger 3 so as to limit the flow of the refrigerant in a direction from the external heat exchanger 3 to the liquid tank 4. A second switching valve $Vs_2$ is installed to an inlet of the bypass passage B to selectively supply the refrigerant to the bypass passage B. A second check value $Vc_2$ is disposed in the bypass passage B so as to limit a flow of the refrigerant in a direction from the compressor 2 to the liquid tank 4. An inlet of the liquid tank 4 is connected to a refrigerant outlet of the external heat exchanger 3 through the first check valve $Vc_1$ and to the bypass passage B trough the second check valve $Vc_2$An outlet of the liquid tank 4 is connected to a first flow control valve 5*a* of a refrigerant valve unit 5. An outlet of the first flow control valve 5*a* is connected to a refrigerant inlet of an auxiliary internal heat exchanger Ea of the internal heat exchanger unit E. A refrigerant outlet of the auxiliary internal heat exchanger Ea is connected to an inlet of a second flow control valve 5*b* of the refrigerant valve unit 5. An outlet of the second flow control valve 5*b* is connected to a refrigerant inlet of a main internal heat exchanger Eb of the internal heat exchanger unit E. A refrigerant outlet of the main internal heat exchanger Eb is connected to a refrigerant inlet of a sub heat exchanger 30. A refrigerant outlet of the sub heat exchanger 30 is connected to an inlet of the compressor 2. The sub heat exchanger 30 is connected to an engine 1 of the vehicle so that the engine coolant circulates it when the coolant valve 12*b* is opened. The sub heat exchanger 30 installed between the main internal heat exchanger Eb and the compressor 2 functions to heat the refrigerant by means of the engine coolant when a coolant valve 12*a* installed in a passage connecting the sub heat exchanger 30 and the engine 1 is opened. This improves the heating performance of the heat pump type air conditioner by increasing the enthalpy of the refrigerant. A heater core 13 is connected to an engine 1 so that cooling water of the engine 1 circulates the heater core 13 when a heater valve 12*b* installed in a passage connecting the heater core 13 and the engine 1 is opened.

The first and second flow control valves 5*a* and 5*b* are of two-state selector valve which takes an open state (generally full open state) by the turning on of a switch (not shown) for operating the first internal heat exchanger 5*a* and takes a choked state (slightly opening state) by the turning off of the switch. By properly controlling the first and second flow control valves 5*a* and 5*b*, the auxiliary and main internal heat exchangers Ea and Eb function as a condenser or evaporator. This enables a desired temperature control without executing a directional switching of the refrigerant flow in the refrigeration cycle.

Figure 3A:
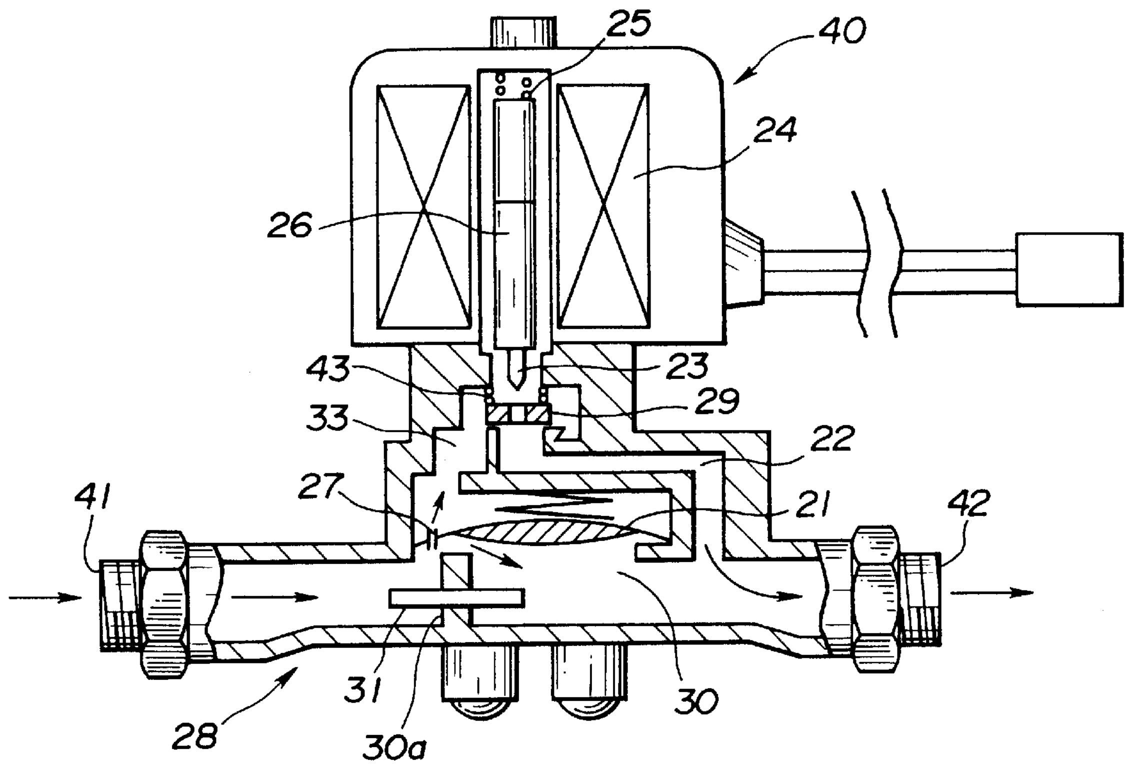
FIG. 3A is a cross sectional view which shows a first flow control valve of FIG. 1 set in an open state.
Figure 3B:
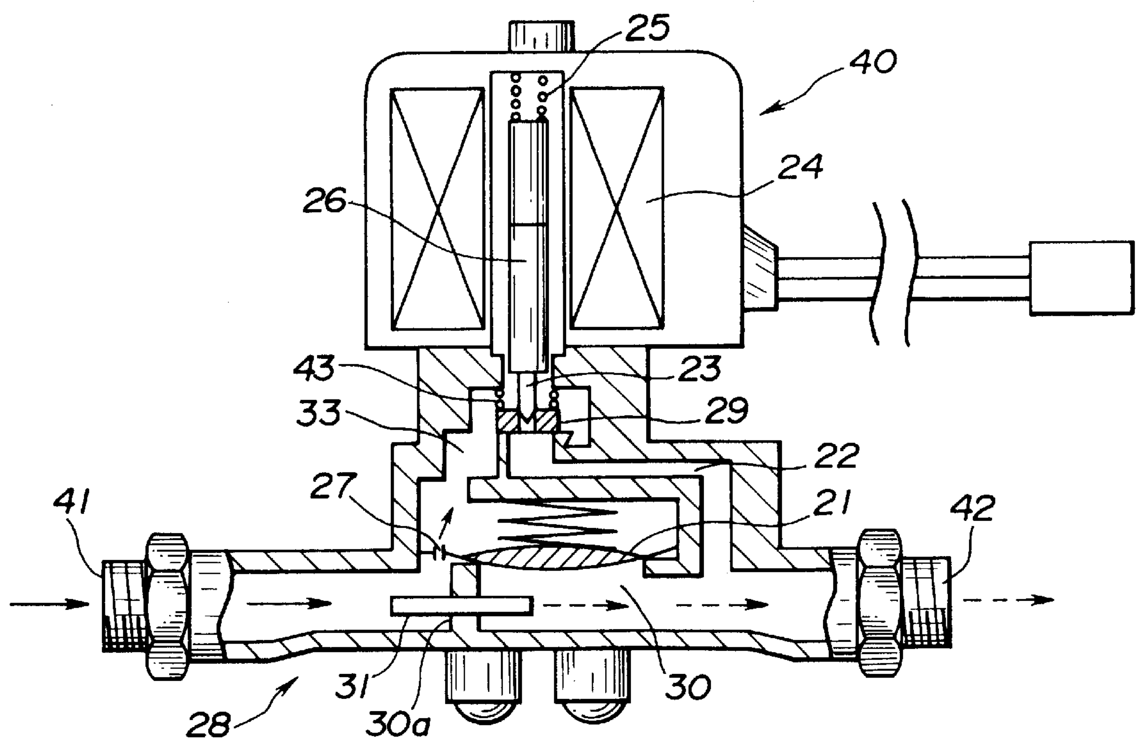
FIG. 3B is a cross sectional view which shows the first flow control valve of FIG. 2 set in a choked state.

As shown in FIGS. 3A and 3B, each of the first and second flow control valves 5*a* and 5*b* is a solenoid valve for controlling the flow of the refrigerant by operating a diaphragm valve 21 functioning as an opening-and-closing valve of a main port 30 is disposed in a valve body 28. The refrigerant flows through the main port 30 when the diaphragm valve 21 is put in the open state. Further, when the diaphragm valve 21 is put in the close state, the refrigerant restrictedly flows through a choked portion 31.

Each of the first and second flow control valves 5*a* and 5*b* is a pressure difference operation type solenoid valve and has a completely same structure. Hereinafter, the first flow control valve 5*a* is representatively discussed. The first flow control valve 5*a* is constituted by the valve body 28 and an electromagnetic pilot 40. The valve body 28 has an inlet connecting port 41 from which the refrigerant is inputted to the first flow control valve 5*a* and an outlet connecting port 42 through which the refrigerant is outputted to the auxiliary internal heat exchanger Ea. The inlet connecting port 41 is connected to an outlet of the liquid tank 4 through a conduit. The outlet connecting port 42 is connected to the refrigerant inlet of the auxiliary internal heat exchanger Ea through a conduit. A diaphragm valve 21 is arranged to vertically displace its valve seal portion 21*a* according to a pressure difference between a pressure in a space above the seal portion 21*a* and a pressure in a space below the seal portion 21*a* in FIGS. 3A and 3B. When the diaphragm valve 21 is moved up, a main port 30 is opened. An equalizing hole 27 is formed at a peripheral portion of the diaphragm valve 21 to communicate the upper space of the diaphragm valve 21 with the high-pressure side. A pilot port 22 is formed in the valve body 28 so as to direct the refrigerant passed through the equalizing hole 27 toward the outlet connecting port 42.

The electromagnetic pilot 40 comprises a pilot valve 29 for opening and closing the pilot port 22, a plunger 26 for operating the pilot valve 29 and a coil 24 for generating electromagnetic power to move up the plunger 26. The plunger 26 is pushed in the downward direction by a spring 25 installed between an upper end of the plunger 26 and an upper surface defining a space surrounded by the coil 24. The pilot valve 29 is upwardly supported by a supporting spring 43 so as to open the pilot port 22. Therefore, when the electromagnetic pilot 40 is turned on, the plunger 26 is moved upward against the pushing force of the spring 25 so that a pilot needle 23 connected to the plunger 26 stops pushing the pilot valve 29 to open the pilot passage 22. On the other hand, when the electromagnetic pilot 40 is turned off, the plunger 26 is positioned at a lower position by the pushing force of the spring 25 so that the pilot needle pushes the pilot valve 29 to close the pilot port 22.

Figure 4:
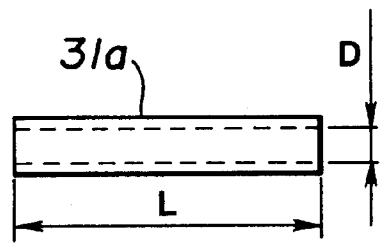
FIG. 4 is a side view of an orifice tube of the first flow control valve.
Figure 5:
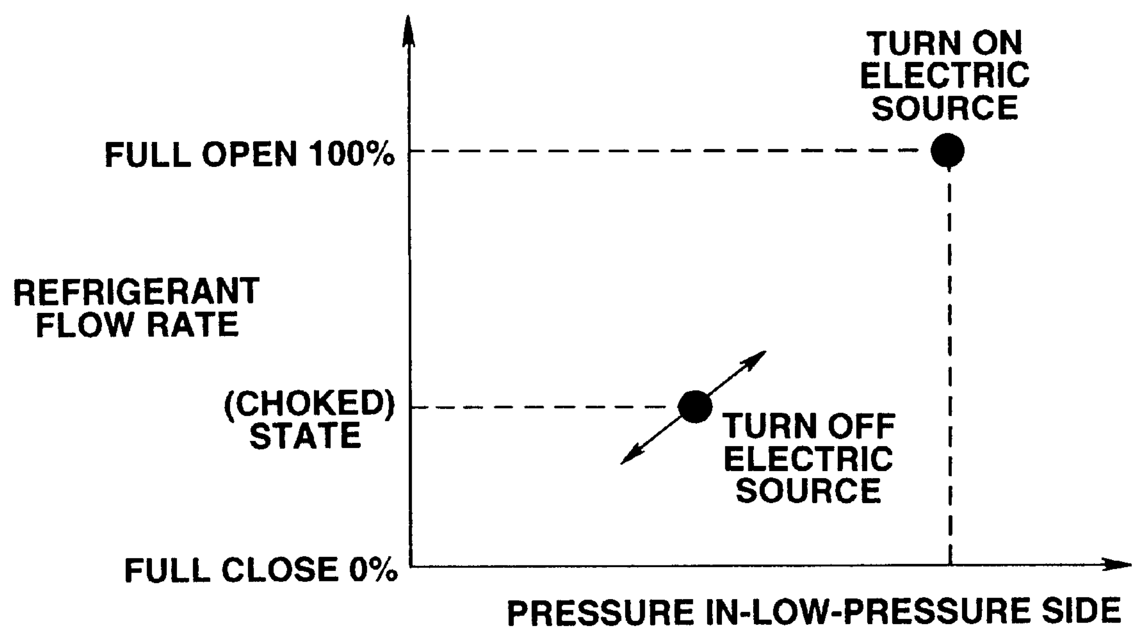
FIG. 5 is a graph which shows an operational characteristic of the first flow control valve.

The choked portion 31 is disposed in the main port 20 so as to restrictedly communicate the high pressure side (upstream side) of the diaphragm valve 21 and the low-pressure side (downstream side) of the diaphragm valve 21 in the main port 30. The choked portion 31 is constituted by fixedly installing an orifice tube 31*a* shown in FIG. 4 at a partition wall 30*a* sharing the high-pressure side and the low-pressure side in the main port 30. The orifice tube 31*a* has a length L and an inner diameter D as shown in FIG. 4. The orifice tube 31*a* is disposed in parallel with a direction from the inlet connecting port 41 to the outlet connecting port 42, as shown in FIGS. 3A and 3B. Therefore, according to the turning ON and OFF of the coil 24 of the electromagnetic pilot 40, the first flow control valve 5*a* selectively takes an open state and a choked state as shown by a graph of FIG. 5. Further, by varying the length L and the inner diameter D, the flow rate in the choked state is changed.

Since the structure and function of the second flow control valve 5*b* is as same as those of the first flow control valve 5*a*, the explanation thereof is omitted herein.

Figure 2:
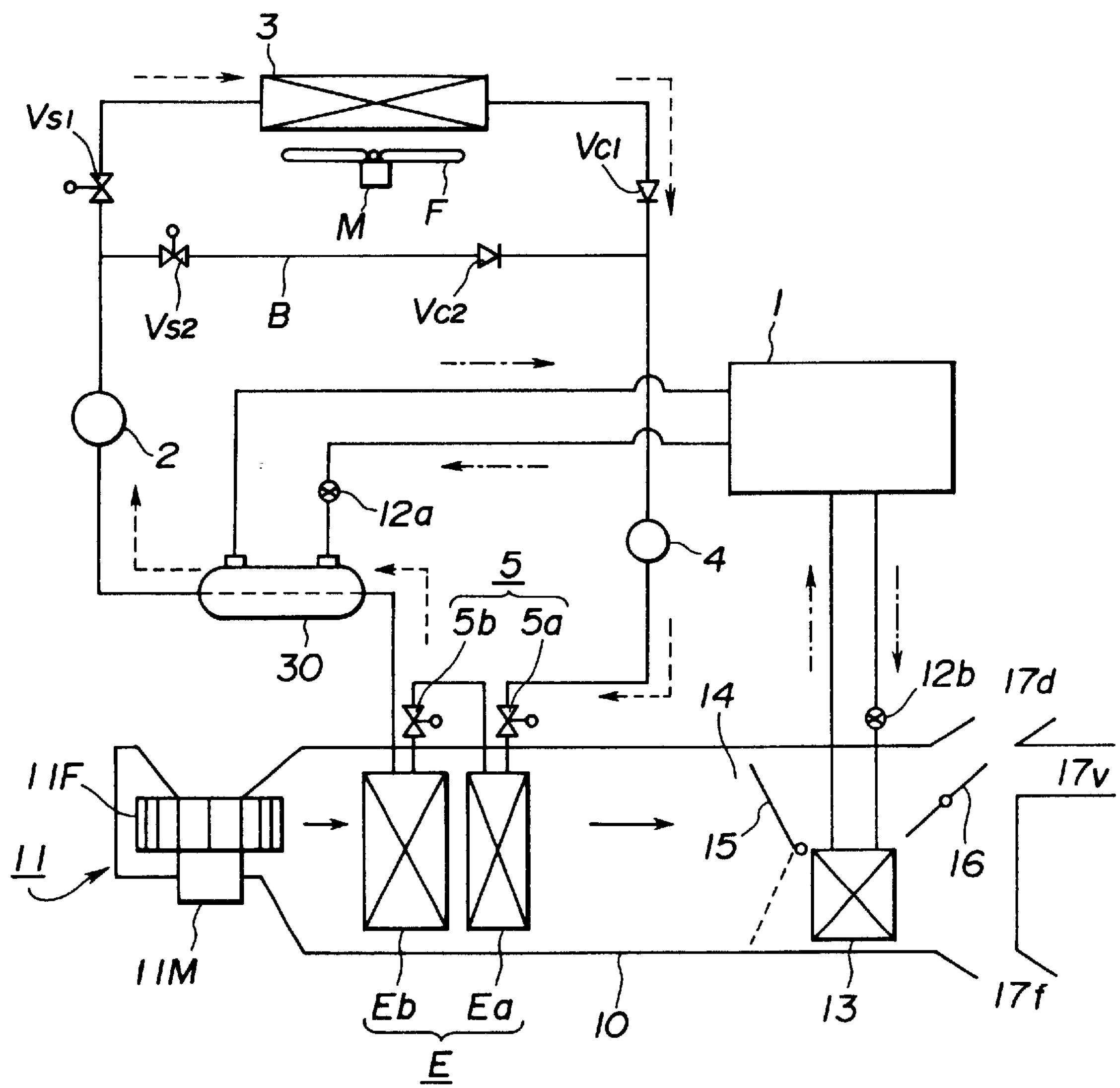
FIG. 2 is a schematic view which shows the first embodiment in a cooling operation.

As shown in FIGS. 1 and 2. the heat pump type air conditioner further comprises a unit case 10 including an air duct 14 through which conditioned air is supplied to a passenger compartment of the vehicle. Air to be conditioned is fed from an air intake unit 11 including a fan 11F, a motor 11M and an intake door (not shown) into the air duct 14 by the operation of the fan 11F driven by the motor 11M. The air fed by the fan 11F is conditioned by the main and auxiliary internal heat exchangers Eb and Ea, an air-mix door 15 and a heat core 13 which are disposed in the air duct 14 in the order of mention. The main and auxiliary internal heat exchangers Eb and Ea are oppositely and adjacently disposed in the air duct 14. An outlet portion of the air duct 14 is divided into various outlets 17 such as a defroster outlet 17*d*, a vent outlet 17*v* and a foot outlet 17*f*.

With reference to FIGS. 1 and 2, the manner of operation of the first embodiment of the heat pump type air conditioner according to the present invention will be discussed hereinafter.

Heating Operation

When the heating operation of the air conditioner is started in a condition that outside air temperature generally ranges from −10° C. to +5° C. or condition that the engine coolant of the engine 1 is too cold to be utilized in the heating operation by the air conditioner such as in a case of idling or low-load condition of the engine 1 just after the starting of the engine 1, the first switching valve $Vs_1$ is closed (full close state) and the second switching valve $Vs_2$ is opened (full open state). Further, the first flow control valve 5*a* is set in an open state and the second flow control valve 5*b* is set in a choked state by turning on a switch (not shown) for operating the auxiliary internal heat exchanger Ea as a condenser. As shown in FIG. 3A. by turning on the coil 24 of the first flow control valve 5*a*. the plunger 26 is moved up by the electromagnetic force generated at the coil 24 to set the pilot valve 29 in a free state. Therefore, the high-pressure refrigerant (pressure PH) inputted from the first connecting port 41 as indicated by an arrow is delivered to a diaphragm chamber 33 through the equalizing hole 27 of the diaphragm valve 21. At this time, it is assumed that the pressure in the diaphragm chamber 33 is PM. The refrigerant in the diaphragm chamber 33 is delivered to the pilot port 22 through a portion around the pilot valve 29. It is assumed that the pressure at an upstream portion of the second connecting port is PL. Since the first flow control valve 5*a* is arranged such that the cross sectional area of the equalizing pressure hole 27 is considerably smaller than the cross sectional area of the opening portion of the pilot valve 29, the pressure PM of the inputted high-pressure refrigerant is greater than the pressure at the diaphragm chamber 33 (PH>PM) and the pressure PM is generally equal to the pressure PL. Therefore, the pressure (combination of PH and PL) at a lover portion of the diaphragm valve 21 becomes greater than the pressure PM at an upper portion of the diaphragm valve 21. Therefore, the diaphragm valve 21 is moved up according to this pressure difference so as to open the main port 30. As a result, the first flow control valve 5*a* is set in an open state.

Under this condition, by the operating the compressor 2, the high-temperature and high-pressure refrigerant is delivered to the auxiliary internal heat exchanger Ea through the bypass passage B, the liquid tank 4 and the first flow control valve 5*a* set in the open state. In this condition, the refrigerant merely passes through the liquid tank 4.

Therefore. air passing through the auxiliary internal heat exchanger Ea is heated by the refrigerant so as to improve the heating characteristic of the air conditioner. The refrigerant, which discharged energy at the auxiliary internal heat exchanger Ea, is liquidized by this heat transfer in some degree. The refrigerant passed through the auxiliary internal heat exchanger Ea is restrictedly supplied into the main internal heat exchanger Eb through the second flow control valve 5*b* set in the choked state to oblige the refrigerant to adiabatic expansion. That is, the refrigerant absorbs heat and vaporizes. This cools the main internal heat exchanger Eb and the air passing through the main internal heat exchanger Eb.

Accordingly. the air delivered by the fan 11F is cooled and dehumidified at the main internal heat exchanger Eb and is heated by the auxiliary internal heat exchanger Ea. This air conditioning operation corresponds to a dehumidifying and heating operation Even when the engine coolant is too cold to be utilized in the heating operation for heating air, the air to be delivered to the passenger compartment is heated by circulating the refrigerant through the auxiliary internal heat exchanger Ea since the refrigerant has a characteristic to be easily and quickly heated and pressurized within a relatively short time period. Therefore, the heat pump type air conditioner according to the present invention performs a high and quick heating performance.

The refrigerant discharged from the main internal heat exchanger Eb is heated through the sub heat exchanger 30 by the engine coolant so as to be completely vaporized. Then, the vaporized refrigerant is returned to the compressor 2. Although the engine coolant is too cold to heat the air to be conditioned, it has the enthalpy for vaporizing the cold refrigerant. Therefore, the refrigerant from the main internal heat exchanger Eb is almost completely vaporized through the sub heat exchanger 30 by the heat transfer between the refrigerant and the engine coolant. This prevents the compressor 2 from compressing the liquid refrigerant and therefore avoids the breakage of parts of the compressor 2.

Further, since the heat of the engine coolant is effectively transferred to the refrigerant by heating the refrigerant at the sub heat exchanger 30, the heated refrigerant is further heated by the compressor 2 so as to further increase the enthalpy of the refrigerant. Therefore, the temperature of the air heated by the further heated refrigerant at the auxiliary internal heat exchanger Ea is raised to a relatively high temperature.

Although the heater core 13 is arranged to circulate the engine coolant to heat the air to be supplied to the passenger compartment, it is necessary that the temperature of the engine coolant is increased by the operation of the engine 1 so as to become applicable for heating the air. Accordingly, until the temperature of the engine coolant is raised to a predetermined temperature preferable for heating the air, the heater valve 12*b* is closed or the air mix door 15 is set at a predetermined position so that the conditioned air bypasses the heater core 13.

With this arrangement of the heat pump type air conditioner according to the present invention, the air delivered to the air duct 14 is dehumidified at the main internal heat exchanger Eb and is heated at the auxiliary internal heat exchanger Ea. Therefore, highly heated air is delivered to the passenger compartment. Further, even if the heating operation is executed under an internal air circulation mode of the air conditioner, the dehumidified hot air is delivered to the passenger compartment is dehumidified hot air. Therefore, a front glass of the vehicle is kept in a defogged condition. This improves the degree of the safety under a vehicle driving condition.

When the heating operation of the air conditioner is executed under a condition that outside air temperature generally ranges from +5° C. to +15° C. or condition that the engine 1 is operated in a relative high-load, the temperature of the engine coolant becomes high so as to be utilized at the heater core 13 in the heating operation of the air conditioner. Therefore, in this condition it is not necessary to execute the heating operation by using the refrigerant energized by the compressor 2. Accordingly, in this condition the operation of the compressor 2 is stopped by cutting the connection between the engine 1 and the compressor 2. More particularly, a clutch, through which the engine 1 and the compressor 2 is connected, is released. This operation decreases the load applied to the engine 1 and enables the heating operation to be executed in energy saving mode.

Cooling Operation

When the cooling operation of the air conditioner is executed under a condition that the outside air temperature generally ranges from +15° C. to +30° C., the first switching valve $Vs_1$ is opened and the second switching valve $Vs_2$ is closed. Further, the first flow control valve 5*a* is set in the choked state, and the second flow control valve 5*b* is set in the open state. As shown in FIG. 3B, by turning off the coil 24 of the first flow control valve 5*a*, the plunger 26 is moved down by the spring 29 to set the pilot valve 29 in a closed state. Therefore, the high-pressure refrigerant (pressure PH) inputted from the first connecting port 41 as indicated by an arrow is delivered to a diaphragm chamber 33 through the equalizing hole 27 of the diaphragm valve 21. At this time, it is assumed that the pressure in the diaphragm chamber 33 is PM. however. since the pilot valve 29 is set in the closed state, the refrigerant in the diaphragm chamber 33 is not delivered to the pilot port 22 and the force for pushing down the pilot valve 29 is further increased. Therefore, the pressure PH becomes generally equal to the pressure PM and the pressure PM becomes greater than the pressure PL. Accordingly, the pressure (combination of PH and PL) at a lower portion of the diaphragm valve 21 becomes smaller than the pressure PM at an upper portion of the diaphragm valve 21. Therefore, the diaphragm valve 21 is moved down according to this pressure difference to close the main port 30. As a result, the first flow control valve 5*a* is set in an choked state.

By this valve setting, the refrigerant discharged from the compressor 2 is delivered to the external heat exchanger 3 through the first switching valve $Vs_1$, as shown in FIG. 2. The external heat exchanger 3 cools and liquidizes the refrigerant. The refrigerant put in the low-temperature and high-pressure state is temporally stored in the liquid tank 4. Then, the refrigerant is restrictedly supplied to the auxiliary internal heat exchanger Ea through the first flow control valve 5*a* set in a choked state to oblige the refrigerant to adiabatic expansion. The refrigerant passed through the auxiliary internal heat exchanger Ea is supplied to the main internal heat exchanger Eb through the second flow control valve 5*b* set in the open state. The main internal heat exchanger Eb further vaporizes the refrigerant. Therefore, the air delivered from the fan 11F is first cooled at the main internal heat exchanger Eb and further cooled at the auxiliary internal heat exchanger Ea.

In case that the outside air temperature generally ranges from +15° C. to +20° C., the temperature of the conditioned air is controlled by changing the opening degree of the air mix door 15 located upstream of the heat core 13 to avoid excessive cooling of the air. More particularly, the opening degree of the air mix door 15 is controlled to properly divide the air cooled by the main and auxiliary internal heat exchangers 5*b* and 5*a* such that part of the air passes through the heater core 13 to be reheated by the heater core 13 and other part of the air is delivered to a bypass passage 14*b* of the air duct 14. Thereafter, the air heated by the heat core 13 and the cool air passed through the bypass passage are mixed to adjust the temperature of the conditioned air at a desired temperature and to be delivered to the passenger compartment through the selected outlets 17*d*, 17*v*, 17*f* of the air duct 14.

In case that the outside air temperature is higher than about +30° C., the first switching valve $Vs_1$ is opened, and the second switching valve $Vs_2$ is closed. Further, the first flow control valve 5*a* is choked and the second flow control valve 5*b* is opened.

By this valve setting, the medium-temperature and high-pressure refrigerant discharged from the liquid tank 4 is restrictedly supplied to the auxiliary internal heat exchanger Ea through the first flow control valve 5*a* set in the choked state to oblige the refrigerant to adiabatic expansion. The refrigerant from the auxiliary internal heat exchanger Ea is supplied to the main internal heat exchanger Eb through the second flow control valve 5*b* set in the open state so that the main internal heat exchanger Eb functions as an evaporator to cool the air flowing therethrough.

Accordingly, the air delivered from the fan 11F is first cooled and dehumidified at the main internal heat exchanger Eb and is further cooled at the auxiliary internal heat exchanger Ea.

Figure 6A:
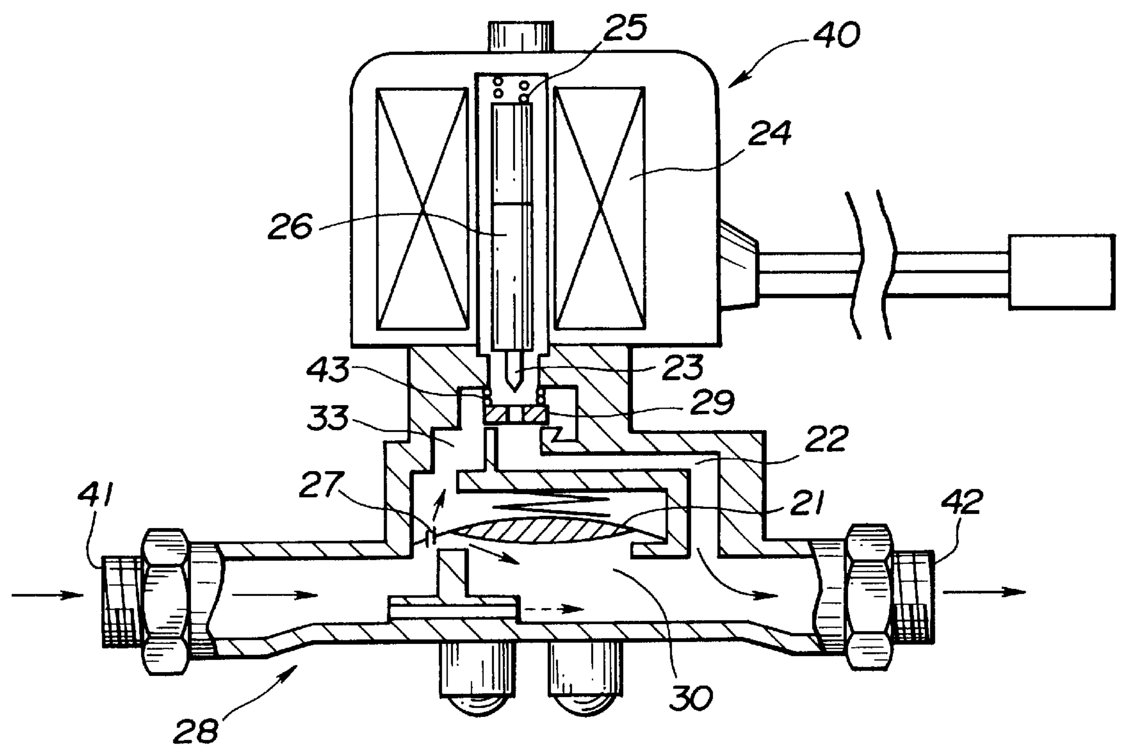
FIG. 6A is a cross sectional view which shows a modification of the first flow control valve of FIG. 3A set in an open state.
Figure 6B:
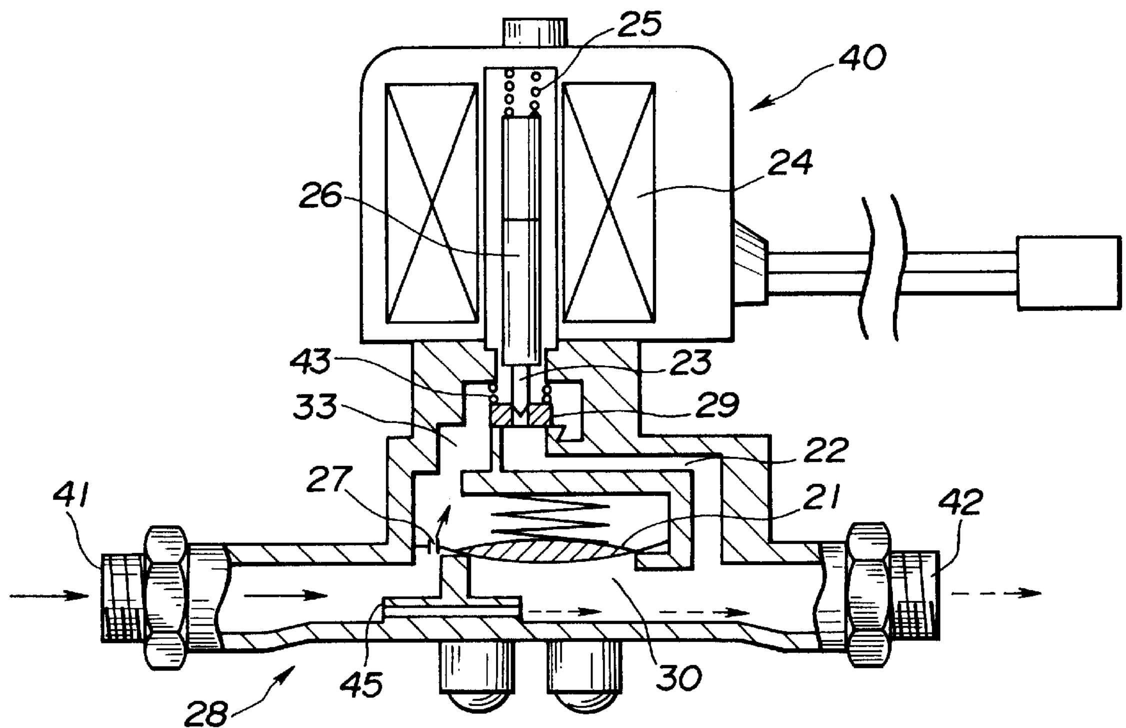
FIG. 6B is a cross sectional view which shows the first flow control valve of FIG. 3B set in a choked state,FIG.

FIGS. 6A and 6B shows a modification of the first flow control valve 5*a* shown in FIGS. 3A and 3B. This flow control valve shown in FIGS. 6A and 6B is arranged such that a choked portion 45 is integrally provided with a valve body 28 by forming a through hole at a partition wall 30*a* as shown in FIGS. 6A and 6B. FIG. 6A shows an open state of the first flow control valve 5*a*, and FIG. 6*b* shows a choked state thereof. Further, parts and elements as same as those of FIGS. 3A and 3B are designated by the same reference numerals and the explanation thereof is omitted herein.

Figure 7:
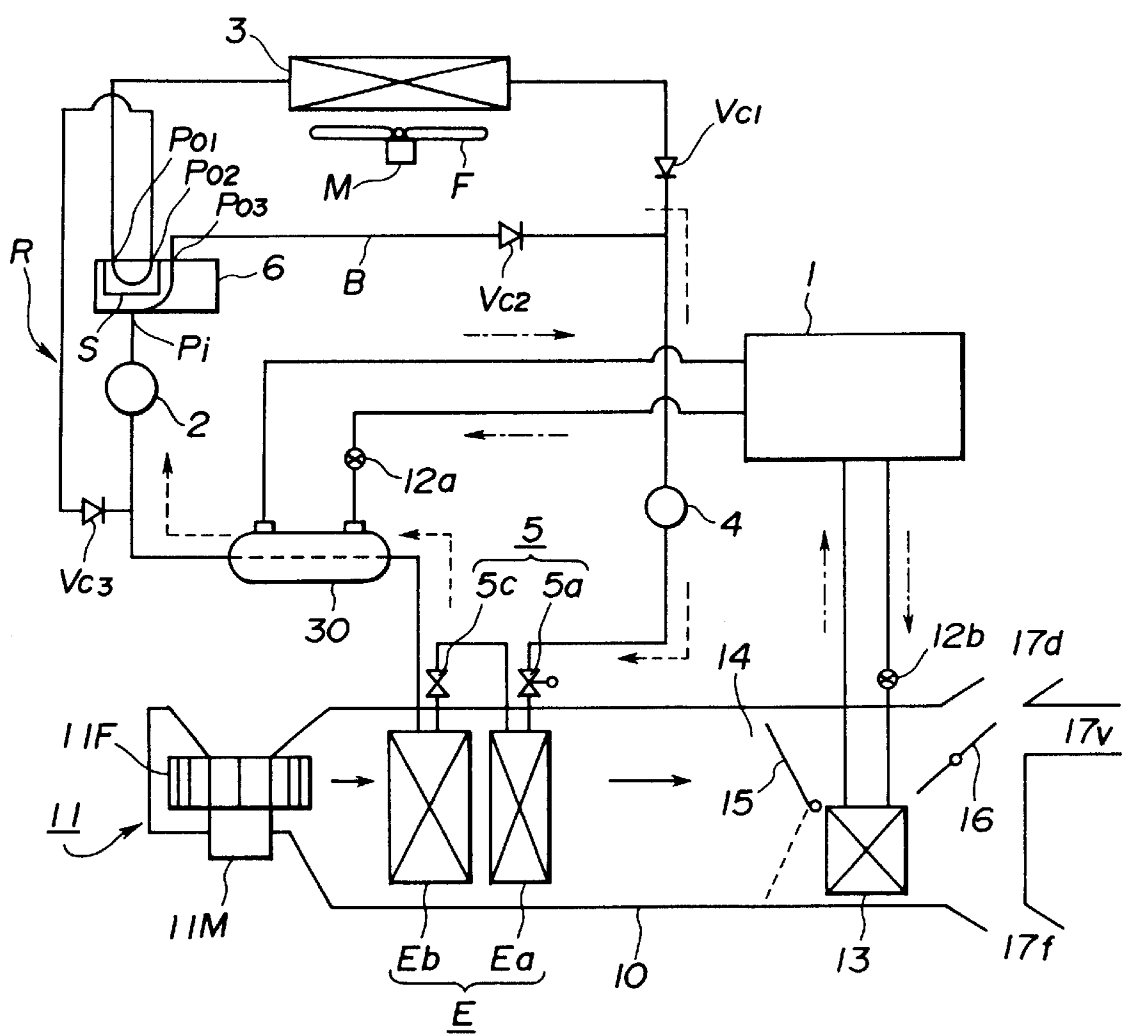
FIG. 7 is a schematic view which shows a second embodiment of the heat pump type air conditioner in a heating operation according to the present invention.
Figure 8:
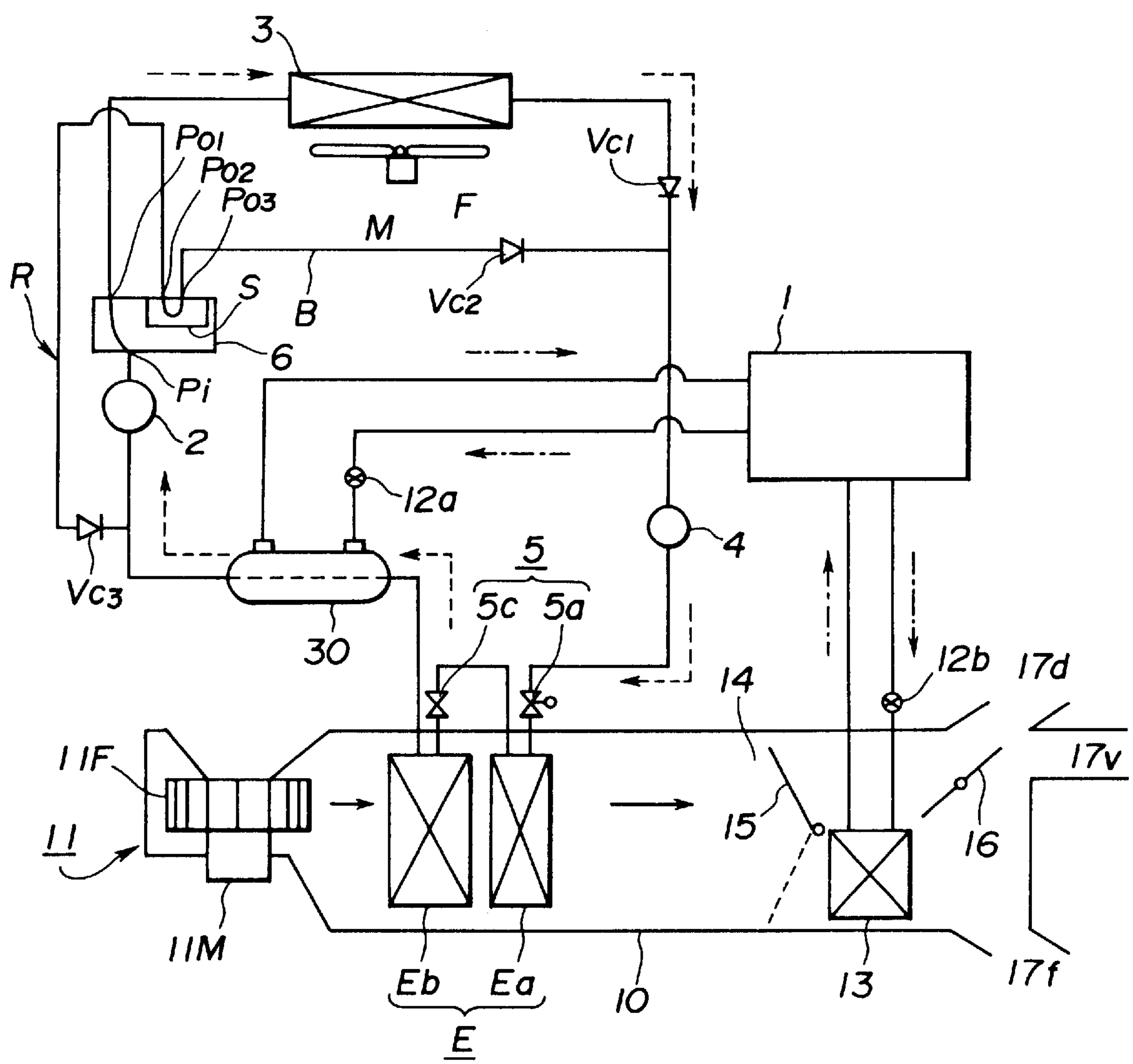
FIG. 8 is a schematic view which shows the second embodiment in a cooling operation.

Referring to FIGS. 7 and 8, there is shown a second embodiment of the heat pump type air condition according to the present invention. The construction of the second embodiment is generally similar to that of the first embodiment except that the first and second switching valves $Ts_1$ and $Ts_2$ are replaced with a four-way valve 6 and a return passage R and that the second flow control valve 5*b* is replaced with an expansion valve 5*c*.

In general, after the stopping of the air conditioner, part of the refrigerant is remained in each component constituting the refrigeration cycle of the air conditioner without returning to the compressor 3. If the compressor 3 is restarted under such refrigerant poor condition for the heating operation, the circulation of the refrigerant becomes insufficient and degrades the heating performance of the air conditioner. Therefore, it is preferable to once return the refrigerant remained in each component such as the external heat exchanger 3 to the compressor 2 before the starting of the compressor 2.

The second embodiment of the heat pump type air conditioner according to the present invention comprises the four-way valve 6 disposed between the compressor 3 and the external heat exchanger 3 and the return passage R connecting the refrigerant inlet of the external heat exchanger 3 with the inlet of the compressor 2 through the four-way valve 6 and a third check valve $Vc_3$, in order to return the refrigerant remained in the external heat exchanger 3 through the return passage R to the compressor 2.

The four-way valve 6 comprises a sealed case 7 having an inlet port Pi and three outlet ports $Po_1$, $Po_2$ and $Po_3$. A slide member S for fluidly communicating two ports of the three outlet ports $Po_1$. $Po_2$ and $Po_3$ it disposed in the sealed case 7. The four-way valve 6 is arranged to communicate the inlet port Pi with one outlet port except for the outlet ports $Po_1$, $Po_2$, $Po_3$ selected by the slide member S.

Accordingly. when the heating operation is started upon setting the four-way valve 6 as shown in FIG. 7, the inlet of the compressor 2 is fluidly communicated with the external heat exchanger 3 through the return passage R. This fluid communication enables the compressor 2 to return the refrigerant remained in the external heat exchanger 3. Accordingly the amount of the refrigerant discharged from the compressor 2 is increased, and therefore the air conditioner maintains its heating performance.

The expansion valve 5*c* is of a temperature control type which has been widely used. This expansion valve 5*c* is arranged to finely control the opening degree thereof according to a temperature of an outlet refrigerant temperature of the main internal heat exchanger Eb through a not-shown temperature sensing cylinder connected with the expansion valve 5*c*. This fine control of the opening degree enables the flow rate of the refrigerant to be finely controlled. That is, when the outlet refrigerant temperature of the main internal heat exchanger Eb becomes low, the expansion valve 5*c* decreases its opening degree to restrict the flow rate of the refrigerant. When it becomes high, the expansion valve 5*c* increases its opening degree to increase the flow rate of the refrigerant to the main internal heat exchanger Eb. These operations of the expansion valve 5*c* function to keep a temperature difference between the vaporizing temperature of the refrigerant in the main internal heat exchanger Eb and the outlet refrigerant temperature of the main internal heat exchanger Eb constant.

By using a selectable flow control valve and a temperature control type expansion valve, it becomes possible to certainly execute the dehumidifying and heating operation. This enables the heating operation in the internal circulation mode without generating fogging of the front window. Therefore. the degree of the safety under the vehicle driving condition is improved by this arranged air conditioner. Further, since the temperature control type expansion valve 5*c* is arranged to vary its opening degree according to the outlet refrigerant temperature of the main internal heat exchanger Eb, the refrigerant control is finely executed.

Heating Operation

When the heating operation is executed under a condition that the outside air temperature generally ranges from −10° C. to +5° C., the four-way valve 6 is set at a heating state such that the refrigerant discharged from the compressor 2 is directly delivered to the liquid tank 4 without flowing through the external heat exchanger 3 and that the remained refrigerant in the external heat exchanger 3 is returned to the compressor 2 through the return passage R, as shown in FIG. 7. Simultaneously, the first flow control valve 5*a* is opened and the expansion valve 5*c* is set in an operation mode.

Under this condition, by operating the compressor 2. the high-temperature and high-pressure refrigerant is sufficiently flowed into the auxiliary internal heat exchanger Ea through the bypass passage B, the liquid tank 4, and the first flow control valve 5*a* set in the open state, as is the same as that in the first embodiment.

Therefore, air passing through the auxiliary internal heat exchanger Ea is heated by the refrigerant so as to improve the heating characteristic of the air conditioner. The refrigerant, which discharges energy in the auxiliary internal heat exchanger Ea, is liquidized by this heat transfer in some degree. The refrigerant passed through the auxiliary internal heat exchanger Ea is restrictedly supplied into the main internal heat exchanger Eb through the expansion valve 5*c* set in the operation mode to oblige the refrigerant to adiabatic expansion. Since the expansion valve 5*c* is of the temperature control type, the opening degree thereof is adjusted at a predetermined opening degree according to the outlet refrigerant temperature of the main internal heat exchanger Eb. That is, when the outlet refrigerant temperature of the main internal heat exchanger Eb is lowered, the opening degree is decreased to restrictedly flow the refrigerant.

Accordingly, the air delivered from the fan 11F is cooled and dehumidified at the main internal heat exchanger Eb and is heated by the auxiliary internal beat exchanger Ea. This air conditioning operation corresponds to a dehumidifying and heating operation.

When the heating operation is executed under a condition that the outside air temperature generally ranges from +5° C. to +15° C., as is the same as that in the first embodiment, the heating operation is executed only by the heater core 13 without operating the compressor 2.

Cooling Operation

When the cooling operation is executed under a condition that the outside air temperature generally ranges from +15° C. to +30° C., the four-way valve 6 is set at a cooling state so that the refrigerant discharged from the compressor 2 is delivered to the external heat exchanger 3 without flowing through the bypass passage B and that the remained refrigerant in the bypass passage B is returned to the compressor 2 through the return passage R, as shown in FIG. 8. Simultaneously, the first flow control valve 5*a* is set in a choked state and the expansion valve 5*c* is set in an operation mode so an to control its valve opening degree.

By this valve setting, the refrigerant discharged from the compressor 2 is delivered to the external heat exchanger 3 through the four-way valve 6, as shown in FIG. 8. The external heat exchanger 3 cools and liquidizes the refrigerant. The refrigerant put in the low-temperature and high-pressure state by the external heat exchanger 3 is temporally stored in the liquid tank 4. Then, the refrigerant is restrictedly supplied to the auxiliary internal heat exchanger Ea through the first flow control valve 5*a* set in the choked state to oblige the refrigerant to adiabatic expansion. The refrigerant passed through the auxiliary internal heat exchanger Ea is supplied to the main internal heat exchanger Eb through the expansion valve 5*c* set in the operation mode. The main internal heat exchanger Eb further vaporizes the refrigerant. Therefore, the air delivered from the fan 11F is first cooled at the main internal heat exchanger Eb and further cooled at the auxiliary internal heat exchanger Ea.

When the outside air temperature is higher than +30° C., the cooling operation is executed as is generally the same as that within the range +15° C. to +30° C.

Figure 9:
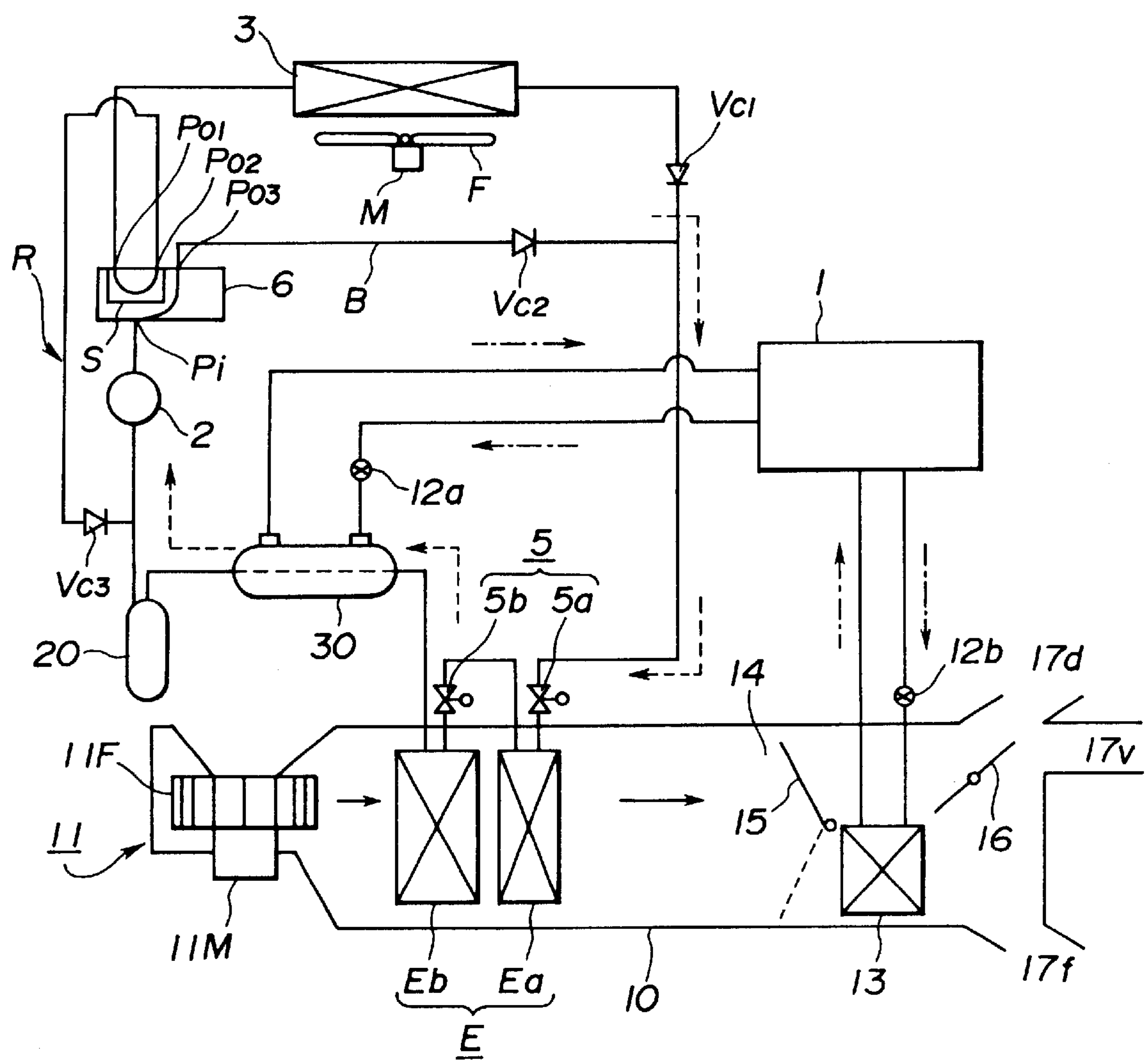
FIG. 9 is a schematic view which shows a third embodiment of the heat pump type air conditioner in a heating operation according to the present invention.
Figure 10:
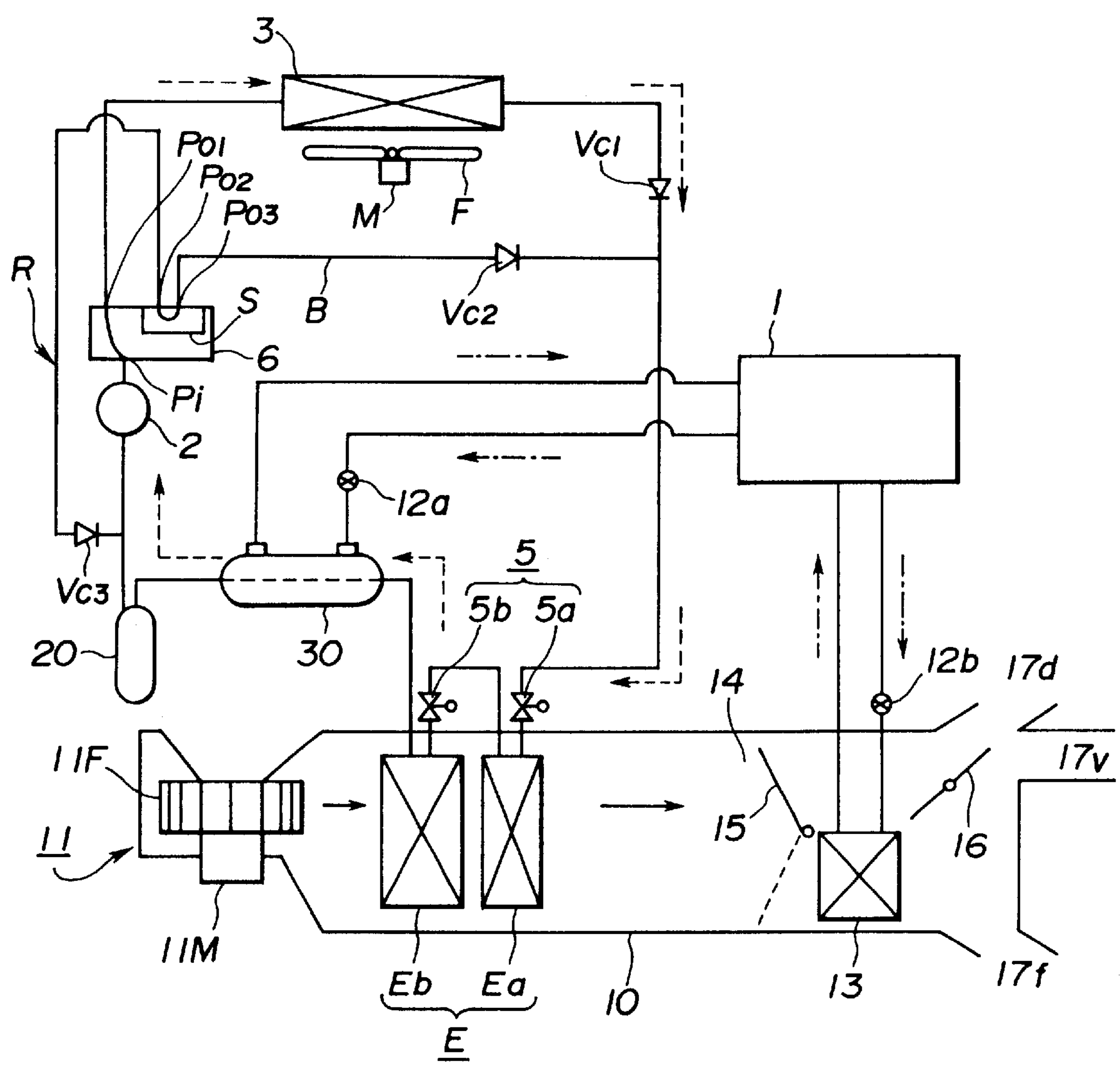
FIG. 10 is a schematic view which shows the third embodiment in a cooling operation.

Referring to FIGS. 9 and 10, there is shown a third embodiment of the heat pump type air conditioner according to the present invention. The construction of the third embodiment is generally similar to that of the second embodiment except that an accumulator 20 is disposed at a refrigerant passage connecting the sub heat exchanger 30 and the compressor and that the liquid tank 4 is removed from the refrigeration cycle, as shown in FIGS. 9 and 10. Further, the electromagnetic valve explained in the first embodiment is employed as the first and second flow control valve 5*a* and 5*b* in this third embodiment.

The manner of operation of the third embodiment of the heat pump type air conditioner according to the present invention will be discussed hereinafter.

Heating Operation

When the heating operation of the air conditioner is started in a condition that outside air temperature generally ranges from −10° C. to +5° C. or condition that the engine coolant of the engine 1 is too cold to be utilized in the heating operation by the air conditioner such as in a case of idling or low-load condition of the engine 1 just after the starting of the engine 1, the four-way valve 6 is set to fluidly communicate the outlet of the compressor 2 and the bypass passage B and to fluidly communicate the external heat exchanger 3 and the refrigerant inlet of the compressor 2 to form a return passage R, as shown in FIG. 9. Simultaneously, the first flow control valve 5*a* is set in an open state and the second flow control valve 5*b* is set in a choked state.

Under this condition, by the operation of the compressor 2 the high-temperature and high-pressure refrigerant is flowed into the auxiliary internal heat exchanger Ea through the bypass passage B and the first flow control valve 5*a* set in the open state. Therefore, air passing through the auxiliary internal heat exchanger Ea is heated by the refrigerant so as to Improve the heating characteristic of the air conditioner. The refrigerant, which discharged energy in the auxiliary internal heat exchanger Ea, is liquidified by this heat transfer in some degree. The refrigerant passed through the auxiliary internal heat exchanger Ea is restrictedly supplied into the main internal heat exchanger Eb through the second flow control valve 5*b* set in the choked state to oblige the refrigerant to adiabatic expansion. That is, the refrigerant absorbs heat and vaporizes to cool the main internal heat exchanger Eb and air passing through the main internal heat exchanger Eb.

Accordingly, the air delivered from the fan 11F is cooled and dehumidified at the main internal heat exchanger Eb and is heated by the auxiliary internal heat exchanger Ea. This air conditioning operation corresponds to a dehumidifying and heating operation. Even in a case that the engine coolant cannot be utilized in the heating operation due to the cold condition of the coolant, the air delivered to the passenger compartment is heated through the auxiliary internal heat exchanger Ea by the refrigerant which is able to be heated and pressurized within a relatively short time period.

The refrigerant discharged from the main internal heat exchanger Eb is heated through the sub heat exchanger 13 by the engine coolant so as to completely vaporized. Although the engine coolant is too cold to heat the air to be condition, it has the enthalpy for vaporizing the cold refrigerant Therefore, the refrigerant from the main internal heat exchanger Eb is almost completely vaporized through the sub heat exchanger 30 by the heat transfer between the refrigerant and the engine coolant. Further, the refrigerant vaporized at the sub heat exchanger 30 is separated from the liquid refrigerant at the accumulator 20. This prevents the compressor 2 from compressing the liquid refrigerant so as to avoid the breakage of parts of the compressor 2. Since the heat of the engine coolant is effectively transferred to the refrigerant by heating the refrigerant through the sub heat exchanger 30, the heated refrigerant is further heated by the compressor 2 so as to further increase the enthalpy of the refrigerant. Therefore, the air heated by the further heated refrigerant through the auxiliary internal heat exchanger Ea is heated to raise its temperature at a relatively high temperature.

Although the heater core 13 is arranged to circulate the engine coolant to heat the air to be supplied to the passenger compartment, it is necessary that the temperature of the engine coolant is increased by the operation of the engine 1 so as to be applicable to heat the air. Accordingly, until the temperature of the engine coolant is raised to a predetermined temperature preferable for heating the air, the heater valve 12*b* is closed or the air mix door 15 is set at a predetermined position so that the conditioned air bypasses the heater core 13.

With this arrangement of the air conditioner, the air delivered into the air duct 14 is dehumidified at the main internal heat exchanger Eb and is heated at the auxiliary internal heat exchanger Ea. Therefore, highly heated air is delivered to the passenger compartment. Further, even if the heating operation is executed under an internal air circulation mode. since the air delivered to the passenger compartment is dehumidified hot air, a front glass of the vehicle is kept in a defogged condition. This improves the degree of the safety under a vehicle driving.

When the heating operation of the air conditioner is executed under a condition that outside air temperature generally ranges from +50° C. to +15° C. or condition that the engine 1 is operated in a relative high-load condition, the engine coolant becomes high so as to be utilized in the heating operation of the air conditioner. Therefore, in this condition it is not necessary to execute the heating operation by using the refrigerant energized by the compressor 2. Accordingly, in this condition the operation of the compressor 2 is stopped by cutting the connection between the engine 1 and the compressor 2. More particularly, a clutch through which the engine 1 and the compressor 2 is connected is released. This operation decreases the load applied to the engine 1 and enables the heating operation to be executed in energy saving mode.

Cooling Operation

When the cooling operation of the air conditioner is executed under a condition that the outside air temperature generally ranges from +15° C. to +30° C., the four-way valve 6 is set to fluidly communicate the outlet of the compressor 2 with the external heat exchanger 3 and to fluidly communicate the bypass passage B with the inlet of the compressor 2 to form the return passage R. Simultaneously, the first flow control valve 5*a* is set in a choked state and the second flow control valve 5*b* is set in an open state.

By this valve setting. the refrigerant discharged from the compressor 2 is delivered to the external heat exchanger 3 through the four-way valve 6, as shown in FIG. 10. The external heat exchanger 3 cools and liquidizes the refrigerant. The refrigerant put in the low-temperature and high-pressure state is restrictedly supplied to the auxiliary internal heat exchanger Ea through the first flow control valve 5*a* set in the choked state to oblige the refrigerant to adiabatic expansion. The refrigerant passed through the auxiliary internal heat exchanger Ea is supplied to the main internal heat exchanger Eb through the second flow control valve 5*b* set in the open state. The main internal heat exchanger Eb further vaporizes the refrigerant. Therefore, the air delivered from the fan 11F is first cooled at the main internal heat exchanger Eb and further cooled at the auxiliary internal heat exchanger Ea.

However, in case that the outside air temperature generally ranges from +15° C. to +20° C., the temperature of the air is controlled by changing the opening degree of the air mix door 15 located upstream of the heat core 13 to avoid excessive cooling of the air. More particularly, the opening degree of the air mix door 15 is controlled to properly divide the air cooled by the main and auxiliary internal heat exchangers 5*b* and 5*a* such that part of the air passes through the heater core 13 to be reheated by the heater core 13 and other part of the air is delivered to a bypass passage of the air duct 14. Thereafter, the air heated by the heat core 13 and the cool air passed through the bypass passage are mixed to be adjust the temperature of the air at a desired temperature and delivered to the passenger compartment through the selected outlets 17*d*, 17*v*, 17*f* of the air duct 14.

In case that the outside air temperature is higher than about +30° C., the four-way valve 6 is set in the cooling state, and the first flow control valves 5*a* is set in the choked state and the second flow control valve 5*b* is set in the open state, an is the same as the setting in the condition that the outside temperature ranges from +15° C. to +20° C. However, the heater care 13 to not used. That is, the opening degree of the air mix door 15 is controlled so as not to deliver the air cooled by the main and auxiliary internal heat exchangers 5*b* and 5*a* to the heat core 13, or to close the heater valve 12*b*.

By this valve setting, the medium-temperature and high-pressure refrigerant discharged from the liquid tank 4 is restrictedly supplied to the auxiliary internal heat exchanger Ea through the first flow control valve 5*a* set in the choked state to oblige the refrigerant to adiabatic expansion. The refrigerant from the auxiliary internal heat exchanger Ea is supplied to the main internal heat exchanger Eb through the second flow control valve 5*b* set in the open state to function as an evaporator.

Figure 11:
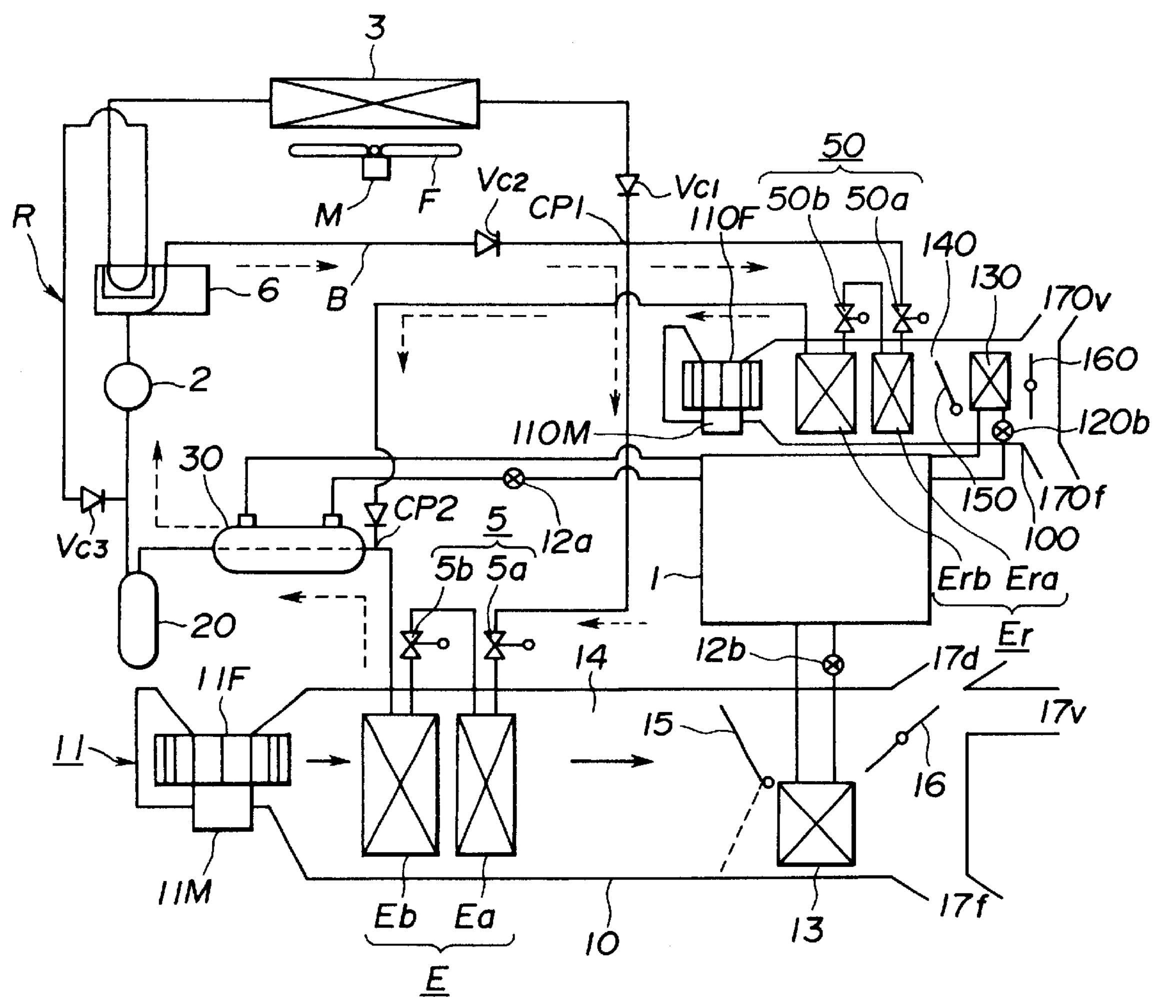
FIG. 11 is a schematic view which shows a fourth embodiment of the heat pump type air conditioner in a heating operation according to the present invention.
Figure 12:
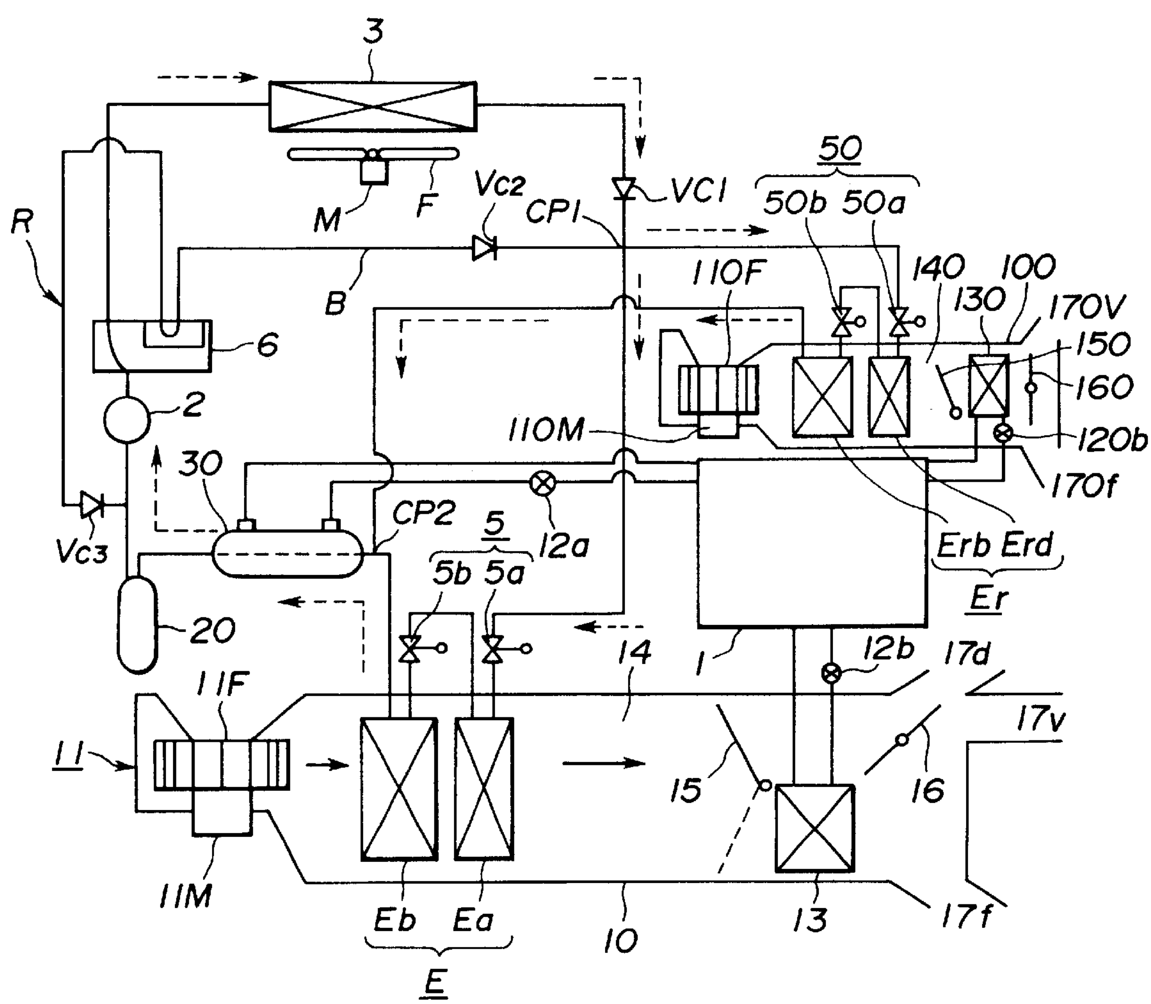
FIG. 12 is a schematic view which shows the fourth embodiment in a cooling operation.

Referring to FIGS. 11 and 12, there is shown a fourth embodiment of the heat pump type air conditioner according to the present invention.

The fourth embodiment of the heat pump type air conditioner according to the present invention further comprises another air conditioning unit for air-conditioning a rear seat side of the vehicle. As shown in FIGS. 11 and 12, the peat pump type air conditioner of the fourth embodiment comprises a first refrigeration cycle for executing the air-conditioning of the front seat portion (hereinafter, calling as a front side) in the passenger compartment having a relatively large space and a second refrigeration cycle for executing the air-conditioning of the rear seat portion (hereinafter, calling as a rear side) in the passenger compartment. The first refrigeration cycle is as same as the refrigeration cycle of the third embodiment. The second refrigeration cycle is arranged such that the refrigerant discharged from the compressor 2 is delivered to the external heat exchanger 3, a rear refrigerant valve unit 50 and a rear internal heat exchanger unit Er. The first refrigeration cycle executes the air conditioning of the front side, and the second refrigeration cycle executes the air condition of the rear seat side. The air conditioner of this type is so called a dual air conditioner. Since the basic construction of the first refrigeration cycle is as same as that of the third embodiment, the explanation of the s construction and the functions of the first refrigeration cycle of thin four embodiment is omitted herein. The construction of the second refrigeration cycle of the fourth embodiment will be discussed hereinafter.

The rear refrigerant valve unit 50 includes first and second flow control valves 50*a* and 50*b*. The rear internal heat exchanger unit Er includes a rear auxiliary internal heat exchanger Era and a rear main internal heat exchanger Erb. The rear refrigerant valve unit 50 and the rear internal heat exchanger unit Er are connected to a connecting point CP1 between the refrigerant outlet of the external heat exchanger 4 and the outlet of the bypass passage B. The refrigerant outlet of the rear main internal heat exchanger Erb is connected to the refrigerant inlet of the sub heat exchanger 30 at a second connecting point CP2. More particularly, the rear first flow control valve 50*a*, the rear auxiliary internal heat exchanger Era, the rear second flow control valve 50*b*, and the rear main internal heat exchanger Erb are serially arranged in the order of mention.

The rear first and rear second internal heat exchangers Era and Erb change their functions into an evaporator or condenser according to the setting thereof. The rear first and rear second flow control valves 50*a* and 50*b* are the same as the first and second flow control valves 5*a* and 5*b* of the electromagnetic valve type. The rear auxiliary internal heat exchanger Era and the rear main internal heat exchanger Erb are oppositely and adjacently disposed in a unit case 100 for the rear sides as is similar as that in the unit case 10 for the front side. The outlet portion of the unit case 100 has various outlet ports 170 such as a foot outlet 170*f* and a vent outlet 170*v*.

The manner of operation of the fourth embodiment of the heat pump type air conditioner according to the present invention will be discussed hereinafter.

Heating Operation

When the heating operation is started in a condition that outside air temperature generally ranges from −10° C. to +5° C. or condition that the engine coolant of the engine 1 is too cold to be utilized in the heating operation such as in an idling or low-load condition of the engine 1 just after the starting of the engine 1. the four-way valve 6 is set to fluidly communicate the outlet of the compressor 2 and the bypass passage B and to fluidly communicate the external heat exchanger 3 and the inlet of the compressor 2 to form a return passage R, as shown in FIG. 11. Simultaneously, the first flow control valve 5*a* and the rear first flow control valve 50*a* are set in the open state, and the second flow control valve 5*b* and the rear second flow control valve 50*b* are set in the choked state.

Under this condition, by operating the compressor 2. the high-temperature and high-pressure refrigerant is flowed into the auxiliary internal heat exchanger Ea through the bypass passage B and the first flow control valve 5*a* set in the open state. Simultaneously, the high-temperature and high-pressure refrigerant is flowed into the rear auxiliary internal heat exchanger Era through the bypass passage B and the rear first flow control valve 50*a* set in the open state. Therefore, air passing through the auxiliary internal heat exchanger Ea is heated by the refrigerant so as to improve the heating characteristic of the air conditioner. Further, air passing through the rear auxiliary internal heat exchanger Era is heated by the refrigerant so as to improve the heating characteristic of the air conditioner. The refrigerant, which discharged energy in the auxiliary internal heat exchanger Ea, is liquidized by this heat transfer in some degree. The refrigerant passed through the auxiliary internal heat exchanger Ea is restrictedly supplied into the main internal heat exchanger Eb through the second flow control valve 5*b* set in the choked state to oblige the refrigerant to adiabatic expansion. Simultaneously, the refrigerant passed through the rear auxiliary internal heat exchanger Era is restrictedly supplied into the rear main internal heat exchanger Erb through the second flow control valve 50*b* set in the choked state to oblige the refrigerant to adiabatic expansion. That is, the refrigerant absorbs heat and vaporizes to cool the main internal heat exchanger Eb and air passing through the rear main internal heat exchanger Eb and to cool the rear main internal heat exchanger Erb and air passing through the rear main internal heat exchanger Erb.

Accordingly, the air delivered from the fan 11F is cooled and dehumidified at the main internal heat exchanger Eb and is heated by the auxiliary internal heat exchanger Ea, and the air delivered from the fan 110F is cooled and dehumidified at the rear main internal heat exchanger Erb and is heated by the rear auxiliary internal heat exchanger Era. This air conditioning operation corresponds to a dehumidifying and heating operation. Even when the engine coolant cannot be utilized in the beating operation due to the cold condition of the coolant, the air delivered to the front side of the passenger compartment is heated through the auxiliary internal heat exchanger Ea by the refrigerant which is able to be heated and pressurized within a relatively short time period. therefore, the air conditioner according to the present invention performs a high and quick heating performance. Simultaneously, the air delivered to the rear side of the passenger compartment is heated through the rear auxiliary internal heat exchanger Era by the refrigerant as is the same as that in the first refrigeration cycle.

The refrigerant discharged from the main internal heat exchanger Eb and the rear main internal heat exchanger Erb is heated through the sub heat exchanger 13 by the engine coolant so as to be completely vaporized. Then, the vaporized refrigerant is once stored in the accumulator 20 to separate the vaporized refrigerant from the liquid refrigerant. The vaporized refrigerant from the accumulator 20 is delivered to the compressor 2. refrigerant. Therefore, the air heated by the further heated refrigerant through the auxiliary internal heat exchanger Ea and the rear auxiliary internal heat exchanger Era is heated at a relatively high temperature.

Although the heat core 13 in the air duct 14 and a rear heater core 130 in the air duct 140 are arranged to circulate the engine coolant to heat the air to be supplied to the passenger compartment, it is necessary that the engine coolant is heated by the engine 1 so as to be applicable to heating the air. Accordingly, until the temperature of the engine coolant is raised to a predetermined temperature preferable for heating the air, the heater valve 12*b* and a rear heater valve 120*b* are closed or the air mix door 15 and a rear air mix door 150 are set at predetermined positions so that the conditioned air bypasses the heater core 13 and the rear heater core 130.

With this arrangement of the dual type air conditioner, the air delivered into the air duct 14 is dehumidified at the main internal heat exchanger Eb and is heated at the auxiliary internal heat exchanger Ea. In addition, the air delivered into the air duct 140 is dehumidified at the rear main internal heat exchanger Erb and is heated at the rear auxiliary internal heat exchanger Era. Therefore, highly heated air is delivered to the both front and rear side of the passenger compartment. Further. even if the heating operation is executed under an internal air circulation mode, the dehumidified hot air is delivered to the passenger compartment. Therefore, a front glass of the vehicle is kept in a defogged condition. This improves the degree of the safety under a vehicle driving condition.

When the heating operation of the air conditioner is executed under a condition that outside air temperature generally ranges from +5° C. to +15° C. or condition that the engine 1 is operated in a relative high-load, the engine coolant is heated so as to be utilized in the heating operation. Therefore, under this condition it is not necessary to execute the heating operation by using the refrigerant energized by the compressor 2. Accordingly, the operation of the compressor 2 is stopped by cutting the connection between the engine 1 and the compressor 2. This operation decreases the load applied to the engine 1 and enables the heating operation to be executed in energy saving mode.

Cooling Operation

When the cooling operation is executed under a condition that the outside air temperature generally ranges from +15° C. to +30° C., the four-way valve 6 is set to fluidly communicate the outlet of the compressor 2 with the external heat exchanger 3 and to fluidly communicate the bypass passage B with the refrigerant inlet of the compressor 2 to form the return passage R, as shown in FIG. 12. Simultaneously, the first flow control valve 5*a* and the rear first flow control valve 50*a* are set in the choked state. and the second flow control valve 5*b* and the rear second flow control valve 50*b* are set in the open state.

By this valve setting, the refrigerant discharged from the compressor 2 is delivered to the external heat exchanger 3 through the four-way valve 6, as shown in FIG. 12. The external heat exchanger 3 cools and liquidizes the refrigerant. The refrigerant put in the low-temperature and high-pressure state is restrictedly supplied to the auxiliary internal heat exchanger Ea through the first flow control value 5*a* and to the rear auxiliary internal heat exchanger Era through the rear first flow control valve 50*a* so as to oblige the refrigerant to adiabatic expansion. The refrigerant passed through the auxiliary internal heat exchanger Ea is supplied to the main internal heat exchanger Eb through the second flow control valve 5*b* set in the open state. The main internal heat exchanger Eb further vaporizes the refrigerant. Therefore, the air delivered from the fan 11F is first cooled at the main internal heat exchanger Eb and further cooled at the auxiliary internal heat exchanger Ea. Simultaneously, the refrigerant passed through the rear auxiliary internal heat exchanger Era is supplied to the rear main internal heat exchanger Erb through the rear second flow control valve 50*b* set in the open state. The rear main internal heat exchanger Eb further vaporizes the refrigerant. Therefore, the air delivered from the fan 110F is first cooled at the rear main internal heat exchanger Erb and further cooled at the rear auxiliary internal heat exchanger Era.

The refrigerant discharged from the main internal heat exchanger Ea and from the rear main internal heat exchanger Era is supplied to the sub heat exchanger 30 wherein the refrigerant is heated by the engine coolant to further vaporize. Then, the refrigerant discharged from the sub heat exchanger 30 is supplied to the accumulator 20 wherein the liquid refrigerant is separated from the vaporized refrigerant so as to supply only the vaporized refrigerant to the compressor 2.

However, in case that the outside air temperature generally ranges from +15° C. to +20° C., the temperature of the conditioning air is controlled by changing the opening degree of the air mix door 150 located upstream of the heat core 130 to avoid excessive cooling of the air. More particularly, the opening degree of the air mix door 150 is controlled to properly divide the air cooled by the rear main and rear auxiliary internal heat exchangers 50*b* and 50*a* such that part of the air is passes through the heater core 130 so as to be reheated by the heater core 130 and other part of the air is delivered to a bypass passage 140*a* of the air duct 140. Thereafter, the air heated by the heat core 130 and the cool air passed through the bypass passage are mixed to adjust the temperature of the conditioned air at a desired temperature. The mixed air is then delivered to the passenger compartment through the selected outlets 170*v* and 170*f* of the air duct 140, as is similar to the air conditioning executed by the unit case 10 for the front side.

With the thus arranged embodiment, even when the engine coolant is too cold to use at the heat cores 13 and 130 for heating, the front side and the rear side of the passenger compartment are heated warmed within a relatively short time.

Since the fourth embodiment is arranged to execute the heating operation by flowing the refrigerant to the front side and the rear side, it is possible to control the heating balance between the front and rear sides by controlling the valve states of the first flow control valve 5*a* and the rear first flow control valve 50*a*. For example. in case that the front side is too warm and the rear side is to be further warmed, the first control valve 5*a* is properly and temporally put in the choked state to increase the flow rate of the refrigerant to be supplied to the second refrigeration cycle so as to increase the heating capacity of the rear side. On the other hand, in case that the rear side is too warm and the front side is to be further warmed, the rear first control valve 50*a* is properly and temporally put in the choked state to increase the flow rate of the refrigerant to be supplied to the first refrigeration cycle so as to increase the heating capacity of the front side.

Figure 13:
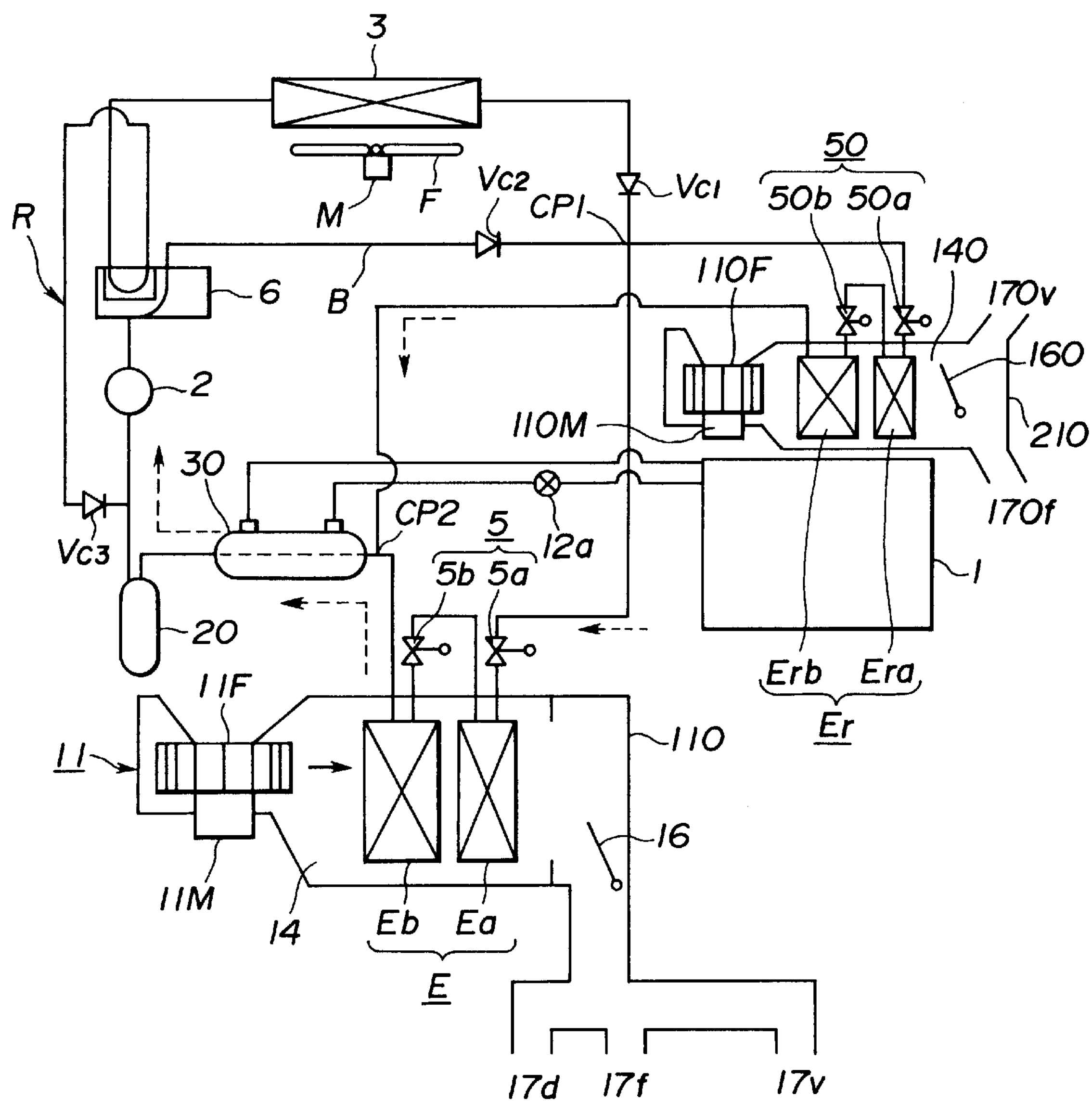
FIG. 13 is a schematic view which shows a fifth embodiment of the heat pump type air conditioner in accordance with the present invention.

Referring to FIG. 13, there is shown a fifth embodiment of the heat pump type air conditioner according to the present invention. The air condition of the fifth embodiment is a dual type as similar to the fourth embodiment. This embodiment is arranged not to comprise the heater cores 13 and 130. The internal heat exchangers Ea, Eb, Era and Erb are arranged to further increase their heat-transfer capacity as compared with those of the internal beat exchangers Ea, Eb, Era and Erb used in the first to fourth embodiments so as to ensure sufficient heating capacity without the heater cores 13 and 130. Therefore, unit cases 110 and 210 are simplified and decreased in sized as shown in FIG. 13.

The manner of operation of the fifth embodiment of the heat pump type dual air conditioner according to the present invention will be discussed hereinafter.

Heating Operation

Since the fifth embodiment does not have the heater cores 13 and 130, the heating operation of the fifth embodiment is always executed by operating the compressor 2. That is, when the heating operation is executed, the four-way valve 6 is sat to fluidly communicate the outlet of the compressor 2 and the bypass passage B and to fluidly communicate the external heat exchanger 3 and the inlet of the compressor 2 to form a return passage R. Simultaneously. the first flow control valve 5*a* and the rear first control valve 50*a* are opened, and the second flow control valve 5*b* and the rear second flow control valve 50*b* are choked as is similar to the heating operation of the fourth embodiment put in a condition that the outside air temperature ranges from −10° C. to +5° C.

Cooling Operation

When the cooling operation of the air conditioner in executed under a condition that the outside air temperature generally ranges from +15° C. to +30° C., the four-way valve 6 is set to fluidly communicate the outlet of the compressor 2 with the external heat exchanger 3 and to fluidly communicate the bypass passage B with the inlet of the compressor 2 to form the return passage R. Simultaneously, the first flow control valve 5*a* and the rear first flow control valve 50*a* are set in the choked state and the second flow control valve 5*b* and the rear second flow control valve 50*b* are set in the open state.

By this valve setting, the refrigerant discharged from the compressor 2 is delivered to the external heat exchanger 3 through the four-way valve 6. The external heat exchanger 3 cools and liquidizes the refrigerant. The refrigerant put in the low-temperature and high-pressure state is restrictedly supplied to the auxiliary internal heat exchanger Ea through the first flow control value 5*a* and to the rear auxiliary internal heat exchanger Era through the rear first flow control valve 50*a* so as to oblige the refrigerant to adiabatic expansion. The refrigerant passed through the auxiliary internal heat exchanger Ea is supplied to the main internal heat exchanger Eb through the second flow control valve 5*b* set in the open state. The main internal heat exchanger Eb further vaporizes the refrigerant. Therefore, the air delivered from the fan 11F is first cooled at the main internal heat exchanger Eb, and further cooled at the auxiliary internal heat exchanger Ea. Simultaneously, the refrigerant passed through the rear auxiliary internal heat exchanger Era is supplied to the rear main internal heat exchanger Erb through the rear second flow control valve 50*b* set in the open state. The rear main internal heat exchanger Erb further vaporizes the refrigerant. Therefore. the air delivered from the fan 110F is first cooled at the rear main internal heat exchanger Erb and further cooled at the rear auxiliary internal heat exchanger Era.

The refrigerant discharged from the main internal heat exchanger Ea and from the rear main internal heat exchanger Era is supplied to the sub heat exchanger 30 wherein the refrigerant is heated by the engine coolant to further vaporize. Then, the refrigerant discharged from the sub heat exchanger 30 is supplied to the accumulator 20 wherein the liquid refrigerant is separated from the vaporized refrigerant so as to supply only the vaporized refrigerant to the compressor 2.

In case that the cooling operation is excessively executed at the front side of the passenger compartment, the first flow control valve 5*a* is set in the open state and the second flow control valve 5*b* is set in the choked state Accordingly, the refrigerant of a temperature about 40° C. to 50° C. is discharged from the external heat exchanger 3 and radiates its heat at the auxiliary internal heat exchanger Ea in some degree. Then, the refrigerant is supplied to the main internal heat exchanger Eb through the second flow control valve 5*b* set in the choked state. The main internal heat exchanger Eb functions to further vaporize the refrigerant. Therefore, the air delivered from the fan 11F is first cooled at the main internal heat exchanger Eb and is heated at the auxiliary internal heat exchanger Er. This prevents the conditioned air from becoming too cool.

In case of the rear side, the rear first flow control valve 50*a* is opened and the rear second flow control valve 50*b* is choked as is similar in the front side to prevent the conditioned air for the rear side from becoming too cool.

With the thus arranged embodiment, the unit cases 110 and 210 are formed small in size as compared with those of the first to fourth embodiment. This further enables the air conditioner to be formed smaller in size and improves easiness for installing the air condition to the vehicle. Further, the structure of the air conditioner is simplified by the decrease of the number of elements. In addition, it becomes possible to prevent the overcooling during the cooling operation only by the control of the flow control valves 5*a*, 5*b*, 50*a* and 50*b* without employing the heater cores 13 and 130.

Referring to FIGS. 14 to 16B, there is shown a sixth embodiment of the heat pump type air conditioner according to the present invention. The sixth embodiment is generally similar to the third embodiment except that a four-way valve 60 and an expansion valve 51 are employed instead of the first and second flow control valves 5*a* and 5*b*.

The auxiliary internal heat exchanger Ea employed in the preferred embodiments including the sixth embodiment is arranged such that a cross section area of a refrigerant passage thereof is gradually decreased from a second port 150 to a first port 250 of the auxiliary internal heat exchanger Ea so as to mainly function as a condenser.

In case that such structured heat exchanger Ea is used as an evaporator. the refrigerant supplied to the auxiliary internal heat exchanger Ea gradually increases its pressure by the execution of the adiabatic expansion of the refrigerant. However, the auxiliary internal heat exchanger Ea is arranged to gradually decrease the cross sectional area of the refrigerant passage from the second part 150 to the first port 250. This structure of the refrigerant passage increases the pressure loss in the refrigerant passage to degrade the circulating performance of the refrigerant in the refrigeration cycle when the auxiliary internal heat exchanger Ea functions as an evaporator. Therefore, the cooling ability of the air conditioner employing this auxiliary internal heat exchanger is degraded when the auxiliary internal heat exchanger Ea is used as an evaporator.

Figure 16A:
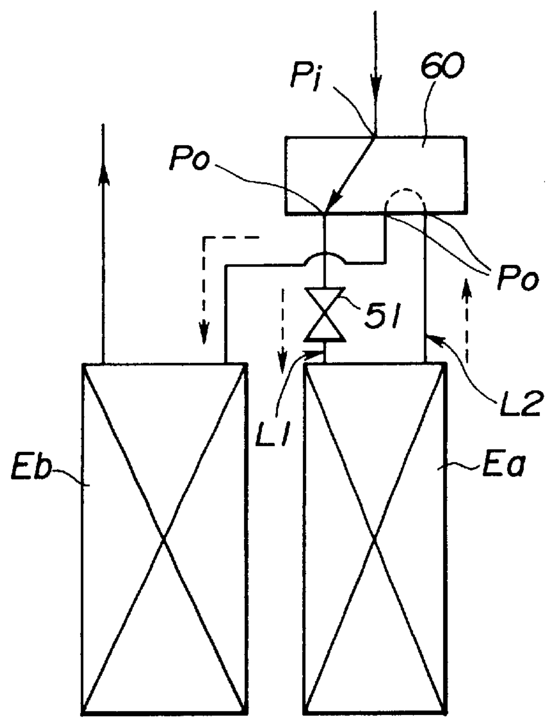
FIGS. 16A and 16B are partial schematic views for explaining the operation of a four-way valve and the auxiliary internal heat exchanger of the sixth embodiment.
Figure 16B:
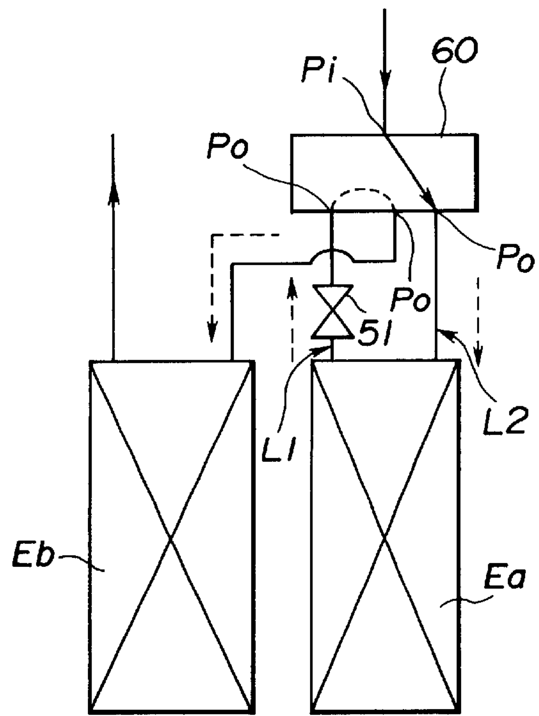

In order to prevent such loss of the cooling ability of the air conditioner, the sixth embodiment is arranged such that when the auxiliary internal heat exchanger Ea is used as an evaporator the refrigerant is inputted from the first port 250. More particularly, the auxiliary internal heat exchanger Ea is provided with a refrigerant passage changing means to change its inlet port according its usage, as shown in FIGS. 16A and 16B.

Figure 14:
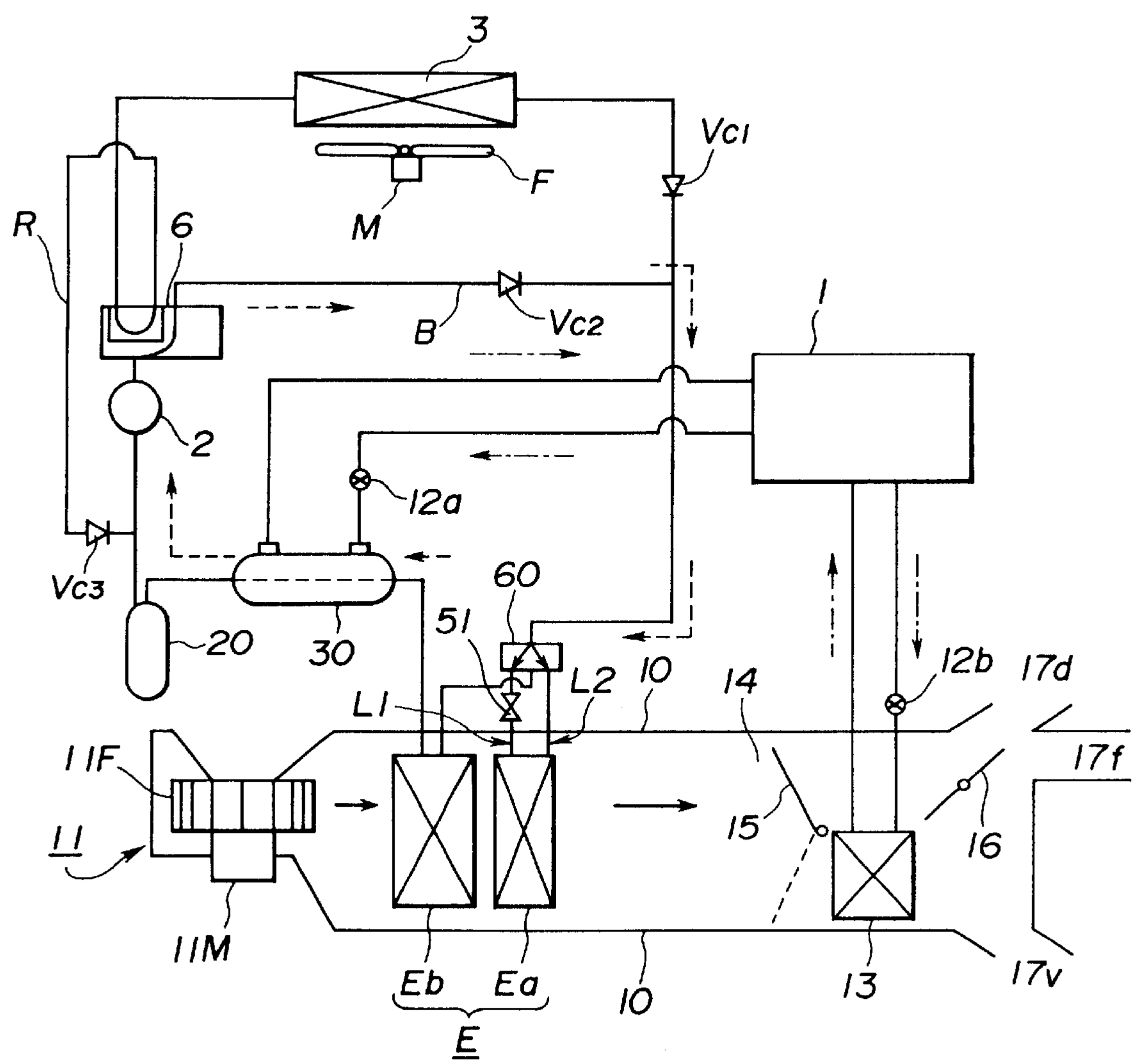
FIG. 14 is a schematic view which shows a sixth embodiment of the heat pump type air conditioner in accordance with the present invention.
Figure 15:
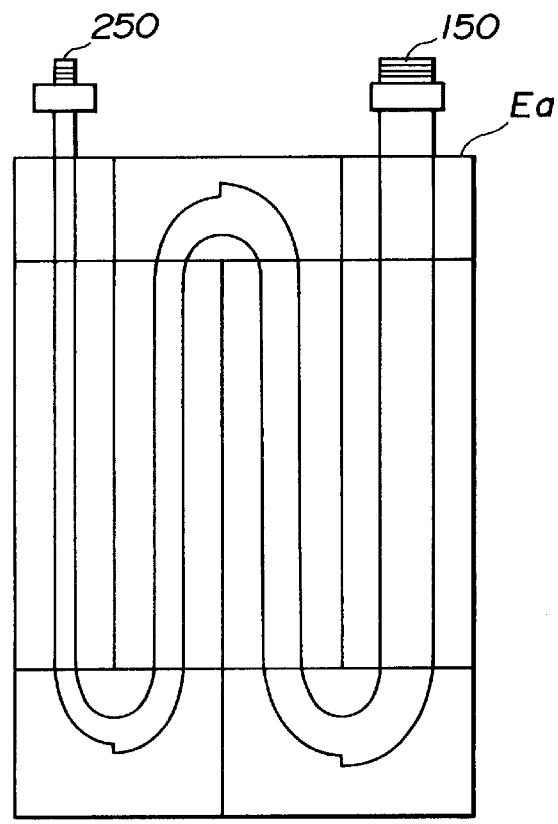
FIG. 15 is a schematic cross sectional view of an auxiliary internal heat exchanger employed in the heat pump type air conditioner according to the present invention.

As shown in FIG. 14, the sixth embodiment of the heat pump type air conditioner according to the present invention is arranged to constitute a refrigeration cycle wherein the refrigerant discharged from the compressor 2 circulates the external heat exchanger 3, an expansion valve 51, and an internal heat exchanger unit E.

The bypass passage B is disposed parallel with the external heat exchanger 3. An inlet end of the bypass passage B, a refrigerant inlet of the external heat exchanger 3, an outlet of the compressor 2 and an inlet of the return passage R and connected to the four-way valve 6. The outlet of the external heat exchanger 3 through the first check valve $Vc_1$ is connected to the outlet of the bypass passage B through the second check valve $Vc_2$. The connected portion between the external heat exchanger 3 and the bypass passage B is connected to a four-way valve 60. The refrigerant discharged from the compressor 2 is supplied to the auxiliary internal heat exchanger Ea through a first passage L1 having the expansion valve 51 or second passage L2. In case that the refrigerant is supplied through the first passage L1 to the first port 250 of the auxiliary internal heat exchanger Ea, the refrigerant is adiabatically expanded by the expansion valve 51 and absorbs the heat of the air passing through the auxiliary internal heat exchanger Ea. That is, in this usage. the auxiliary internal heat exchanger Ea functions as an evaporator. On the other hand, in case that the refrigerant is supplied through the second passage L2 to the second port 150 of the auxiliary internal heat exchanger Ea, the refrigerant having relatively high pressure is liquidized at the auxiliary internal heat exchanger Ea. That is, in this usage, the auxiliary internal heat exchanger Ea functions as a condenser.

By switching the four-way valve 60 to select one of the first and second passage L1 and L2 as an inlet passage of the auxiliary internal heat exchanger Ea, the function of the auxiliary internal heat exchanger Ea is selected from one of an evaporator and a condenser. The refrigerant discharged from the auxiliary internal heat exchanger Ea is supplied to the main internal heat exchanger Eb through one of the first and second passages L1 and L2. Further, the refrigerant discharged from the main internal heat exchanger Eb is vaporized at the sub heat exchanger 30 and is then separated from the liquid refrigerant at the accumulator 20 to supply the vaporized refrigerant to the compressor 2.

Next, the manner of operation of the sixth embodiment of the heat pump type air conditioner according to the present invention will be discussed with reference to FIGS. 16A and 16B.

Heating Operation

When the heating operation is executed under a condition that the outside air temperature generally ranges from −10° C. to +5° C., the four way valve 6 is set at a heating state such that the refrigerant discharged from the compressor 2 is delivered to the bypass passage without flowing through the external heat exchanger 3 and that the remained refrigerant in the external heat exchanger 3 is returned to the compressor 2 through the return passage R. Simultaneously, the four-way valve 60 is set such that the refrigerant is supplied through the second passage L2 to the second port 150 of the auxiliary internal heat exchanger Ea as shown in FIG. 168. The refrigerant supplied to the auxiliary internal heat exchanger Ea radiates its heat and is liquidized. Then, the refrigerant discharged from the auxiliary internal heat exchanger Ea is supplied to the main internal heat exchanger Eb through the first passage L1 and the expansion valve 51. The refrigerant restrictedly flows through the expansion valve 51 while executing adiabatic expansion and is supplied to the main internal heat exchanger Eb. The adiabatic expansion refrigerant absorbs the heat of the air passing through the main internal heat exchanger Eb. Therefore, the air directed by the fan 11F in the unit case 10 is cooled and dehumidified at the main internal heat exchanger Eb and heated at the auxiliary internal heat exchanger Ea. Then, the conditioned air is supplied to the passenger compartment to execute the dehumidifying and heating operation.

When the heating operation is executed under a condition that the outside air temperature generally ranges from +5° C. to +15° C., the heating operation is executed only by the heater core 13 without operating the compressor 2, as is the same as that in the third embodiment.

Cooling Operation

When the cooling operation is executed under a condition that the outside air temperature generally ranges from +15° C. to +30° C., the four-way valve 6 is set at a cooling state so that the refrigerant discharged from the compressor 2 is delivered to the external heat exchanger 3 without passing through the bypass passage B. Simultaneously, the four-way valve 60 is set such that the refrigerant liquidized at the external heat exchanger 3 is supplied to the first port 250 of the auxiliary internal heat exchanger Ea through the first passage L1 and the expansion valve 51 as shown in FIG. 16A. The expansion valve 51 executes the adiabatic expansion of the refrigerant, and the auxiliary internal heat exchanger Ea executes the heat transfer from the air to the refrigerant. The refrigerant discharged from the auxiliary internal heat exchanger Ea is supplied to the main internal heat exchanger Eb and is further vaporized so as to absorb the heat of the air passing through the main internal heat exchanger Eb. Therefore, the air delivered from the fan 11F is first cooled and dehumidified at the main internal heat exchanger Eb and further cooled and dehumidified at the auxiliary internal heat exchanger Ea.

In case that the cooling operation is excessively executed, as is similar to the execution in the first embodiment, the temperature control of the conditioning air may be executed by properly using the heater core 13 and the air mix door 15.

With the thus arranged sixth embodiment, by switching the inlet passage to the auxiliary internal heat exchanger Ba. it becomes possible to ensure high heating performance of the auxiliary internal heat exchanger Ea used as a condenser and to decrease the pressure loss at the auxiliary internal heat exchanger Ea used as an evaporator so as to prevent the decrease of the refrigerant flow rate in the refrigeration cycle.

What is claimed is:

1. A heat pump type air conditioner for a vehicle executing a heating operation and a cooling operation according to a temperature condition, said heat pump type air conditioner comprising:

refrigerant;

a compressor applying workload to said refrigerant;

an external heat exchanger connected to an outlet of said compressor;

a bypass passage connecting a refrigerant inlet and a refrigerant outlet of said external heat exchanger;

a flow mode selector that selects a heating flow mode when the heating operation is executed and selects a cooling flow mode when the cooling operating is executed, said refrigerant flowing through said bypass passage without flowing through said external heat exchanger when the heating flow mode is selected, said refrigerant flowing through said external heat exchanger without flowing through said bypass passage when the cooling flow mode is selected;

a first flow control valve connected to the refrigerant outlet of said external heat exchange, said first flow control valve being an electromagnetic valve which comprises a valve body having a port through which said refrigerant flows, a valve opening and closing the port according to an electrical signal, and a choked portion through which said refrigerant restrictedly flows when the port is closed by said valve;

an auxiliary internal heat exchanger connected to an outlet of said first flow control valve;

a second flow control valve connected to a refrigerant outlet of said auxiliary internal heat exchanger;

a main internal heat exchanger connected to an outlet to said second flow control valve, a refrigerant outlet of said main internal heat exchanger being connected to an inlet of said compressor;

air delivering means for passing air through said main and auxiliary internal heat exchangers and delivering the air to a passenger compartment of the vehicle;

a sub heat exchanger connected to the refrigerant outlet of said main internal heat exchanger and the inlet of said compressor, said sub heat exchanger being arranged to heat said refrigerant by means of engine coolant of a vehicular engine;

a heater core which is connected to the vehicular engine so that the engine coolant circulates said heater core, said heater core being disposed in said air delivering means and downstream of said main and auxiliary internal heat exchangers; and an air-mix door disposed between said auxiliary internal heat exchanger and said heater core, said air-mix door controlling a quantity of the air passing through said heater core.

2. A heat pump type air conditioner as claimed in claim 1, wherein said first flow control valve is arranged to be selectively set in an open state and a choked state.

3. A heat pump type air conditioner as claimed in claim 2, wherein said second flow control valve is arranged to be selectively set in an open state and a choked state.

4. A heat pump type air conditioner as claimed in claim 1. wherein said first flow control valve is set in an open state when the heating operation is executed so that said auxiliary internal heat exchanger functions as a condenser.

5. A heat pump type air conditioner as claimed in claim 1, wherein said second flow control valve is set in a choked state for restrictedly flowing said refrigerant when the heating operation is executed so that said main internal heat exchanger functions as an evaporator.

6. A heat pump type air conditioner as claimed in claim 1, wherein said first flow control valve is set in a choked state for restrictedly flowing said refrigerant when the cooling operation is executed so that said auxiliary internal heat exchanger functions as an evaporator.

7. A heat pump type air conditioner as claimed in claim 6, wherein said second flow control valve is set in an open state so that said main internal heat exchanger functions as an evaporator.

8. A heat pump type air conditioner as claimed in claim 1, wherein the choked portion is an orifice tube having a predetermined inner diameter d and a predetermined length D.

9. A heat pump type air conditioner as claimed in claim 1, wherein the choked portion is integrally formed with the valve body.

10. A heat pump type air conditioner as claimed in claim 1, wherein said first flow control valve is an electromagnetic valve constituted by a valve body and an electromagnetic pilot, the valve body including a first connecting port to which said refrigerant is inputted, a second connecting port from which said refrigerant is outputted, a main port on which a diaphragm valve is opened and closed, an equalizing pressure hole penetratingly formed in the diaphragm valve, and a pilot port through which the refrigerant passing through the equalizing pressure hole is directed to the second connecting port, the electromagnetic pilot including a pilot valve for opening and closing the pilot port, a plunger for operating the pilot valve, and a coil which generates electromagnetic force for moving the plunger, wherein a choked portion is formed such that said refrigerant is restrictedly flowed from the first connecting port to the second connecting port in the valve body.

11. A heat pump type air conditioner as claimed in claim 1, further comprising a liquid tank connected to the outlet of said external heat exchanger and the inlet of the first flow control valve.

12. A heat pump type air conditioner as claimed in claim 1, wherein when the heating operation is executed and when a temperature of the engine coolant is less than a predetermined temperature, said air-mix door is controlled so that the air heated by said main and auxiliary internal heat exchangers bypasses said heater core.

13. A heat pump type air conditioner as claimed in claim 1, wherein when the heating operation is executed and when a temperature of the engine coolant becomes greater than a predetermined value, said compressor is stopped and the air is heated only by said heater core.

14. A heat pump type air conditioner as claimed in claim 1, further comprising a heater valve installed between the engine and the heater core, wherein, when the temperature of the engine coolant is less than a predetermined temperature, the heater valve is closed to stop flowing the engine coolant to the heater core or the air-mix door is set at a predetermined position at which the conditioned air bypasses the heater core.

15. A heat pump type air conditioner as claimed in claim 1, further comprising a refrigerant returning means for returning said refrigerant remaining in said external heat exchanger when the heating operation is executed.

16. A heat pump type air conditioner as claimed in claim 1, further comprising an accumulator which is connected to the refrigerant outlet of said main internal heat exchanger and the inlet of said compressor.

17. A heat pump type air conditioner as claimed in claim 1, wherein each of said first and second flow control valves is a pressure difference operation type solenoid valve.

18. A heat pump type air conditioner for a vehicle executing a heating operation and a cooling operation according to a temperature condition, said heat pump type air conditioner comprising;

refrigerant;

a compressor applying workload to said refrigerant;

an external heat exchanger connected to an outlet of said compressor;

a bypass passage connecting a refrigerant inlet and a refrigerant outlet of said external heat exchanger, said refrigerant flowing through said bypass passage without flowing through said external heat exchanger when the heating operation is executed;

a first flow control valve connected to a refrigerant outlet of said external heat exchanger;

an auxiliary internal heat exchanger connected to an outlet of said first flow control valve;

a second flow control valve connected to a refrigerant outlet of said auxiliary internal heat exchanger;

a main internal heat exchanger connected to an outlet of said second flow control valve, a refrigerant outlet of said main internal heat exchanger being connected to an inlet of said compressor;

air delivering means for passing air through said main and auxiliary internal heat exchangers and delivering the air to a passenger compartment of the vehicle;

a sub heat exchanger connected to the refrigerant outlet of said main internal heat exchanger and the inlet of said compressor, said sub heat exchanger being arranged to heat said refrigerant by means of engine coolant of a vehicular engine;

a heater core which is connected to the vehicular engine so that the engine coolant circulates said heater core, said heater core being disposed in said air delivering means and downstream of said main and auxiliary internal heat exchangers, wherein said first flow control valve is an electromagnetic valve which comprises a valve body, an electromagnetic pilot, and a choked portion formed such that said refrigerant is restrictedly flowed from a first connecting port to a second connecting port in the valve body; and an air-mix door disposed between said auxiliary internal heat exchanger and said heater core, said air-mix door controlling a quantity of the air passing through said heater core.

19. A heat pump type air conditioner as claimed in claim 18, wherein the valve body comprises a first connecting port through which the refrigerant is inputted, the second connecting port from which the refrigerant is outputted, a main port through which the refrigerant flows through said valve body, a diaphragm valve opening and closing the main port, an equalizing hole formed in the diaphragm valve so as to fluidly communicate a first side surface and a side of the other surface of the diaphragm valve, and a pilot port directing the refrigerant passed through the equalizing hole to the second connecting port, the electromagnetic pilot comprising a pilot valve opening and closing the pilot port, a plunger operating the pilot valve, and a coil generating electromagnetic force for moving the plunger.

20. A heat pump type air conditioner as claimed in claim 18, wherein said choked portion is constituted by fixedly installing an orifice tube at a partition wall which shares a high-pressure side and a low-pressure side in the main port.

21. A heat pump type air conditioner as claimed in claim 18, wherein each of said first and second flow control valves is a pressure difference operation type solenoid valve.

22. A heat pump type air conditioner for a vehicle executing a heating operation and a cooling operation according to a temperature condition, said heat pump type air conditioner comprising:

refrigerant;

a compressor applying workload to said refrigerant;

an external heat exchanger connected to an outlet of said compressor;

a bypass passage connecting a refrigerant inlet and a refrigerant outlet of said external heat exchanger;

a flow mode selector connected to the outlet of said compressor, the refrigerant inlet of said external heat exchanger and an inlet of said bypass passage, said flow mode selector flowing said refrigerant from said compressor to said external heat exchanger without flowing said refrigerant to said bypass passage when the cooling operation is executed, said flow mode selector flowing said refrigerant from said compressor to said bypass passage without flowing said refrigerant to said external heat exchanger when the heating operation is executed;

a first flow control valve connected to the refrigerant outlet of said external heat exchanger;

an auxiliary internal heat exchanger connected to an outlet of said first flow control valve;

a second flow control valve connected to a refrigerant outlet of said auxiliary internal heat exchanger;

a main internal heat exchanger connected to an outlet to said second flow control valve, a refrigerant outlet of said main internal heat exchanger being connected to an inlet of said compressor;

air delivering means for passing air through said main and auxiliary internal heat exchangers and delivering the air to a passenger compartment of the vehicle;

a sub heat exchanger connected to the refrigerant outlet of said main internal heat exchanger and the inlet of said compressor, said sub heat exchanger being arranged to heat said refrigerant by means of engine coolant of a vehicular engine;

a heater core which is connected to an engine of the vehicle so that engine coolant circulates the heater core, the heater core being disposed in said air delivering means; and an air-mix door disposed between said auxiliary internal heat exchanger and said heater core, said air-mix door controlling a quantity of the air passing through said heater core.

* * * * *